(12) United States Patent
Francon et al.

(10) Patent No.: US 12,099,934 B2
(45) Date of Patent: Sep. 24, 2024

(54) FRAMEWORK FOR INTERACTIVE EXPLORATION, EVALUATION, AND IMPROVEMENT OF AI-GENERATED SOLUTIONS

(71) Applicant: Cognizant Technology Solutions U.S. Corporation, College Station, TX (US)

(72) Inventors: Olivier Francon, Sainte Foy lès Lyon (FR); Babak Hodjat, Dublin, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 787 days.

(21) Appl. No.: 17/209,623

(22) Filed: Mar. 23, 2021

(65) Prior Publication Data

US 2021/0312297 A1    Oct. 7, 2021

Related U.S. Application Data

(60) Provisional application No. 63/006,434, filed on Apr. 7, 2020.

(51) Int. Cl.
*G06N 3/12* (2023.01)
*G06N 5/04* (2023.01)
*G06N 20/00* (2019.01)

(52) U.S. Cl.
CPC ............ *G06N 3/12* (2013.01); *G06N 5/04* (2013.01); *G06N 20/00* (2019.01)

(58) Field of Classification Search
CPC ...................................................... G06N 3/12
(Continued)

(56) References Cited

U.S. PATENT DOCUMENTS 5,140,530 A * 8/1992 Guha ..................... G06N 3/086
706/31
5,761,381 A * 6/1998 Arci ...................... G06N 3/086
706/19

(Continued)

FOREIGN PATENT DOCUMENTS

EP          0762294 A2    3/1997
EP          2422276 A1    2/2012
(Continued)

OTHER PUBLICATIONS

Alois Pourchot et. al. , "CEM-RL: Combining evolutionary and gradient-based methods for policy search", arXiv preprint arXiv:1810.01222v3, Oct. 2, 2018. 19 pages.

(Continued)

*Primary Examiner* — Reza Nabi
(74) *Attorney, Agent, or Firm* — Dawn-Marie Bey; Bey & Cotropia PLLC

(57) ABSTRACT

User-driven exploration functionality, referred to herein as a Scratchpad, is a post-learning extension for machine learning systems. For example, in ESP, consisting of the Predictor (a surrogate model of the domain) and Prescriptor (a solution generator model), the Scratchpad allows the user to modify the suggestions of the Prescriptor, and evaluate each such modification interactively with the Predictor. Thus, the Scratchpad makes it possible for the human expert and the AI to work together in designing better solutions. This interactive exploration also allows the user to conclude that the solutions derived in this process are the best found, making the process trustworthy and transparent to the user.

26 Claims, 30 Drawing Sheets

(58) Field of Classification Search
USPC .......................................................... 706/13
See application file for complete search history.

(56) References Cited

U.S. PATENT DOCUMENTS

| | | | |
|---|---|---|---|
| 5,845,266 A | 12/1998 | Lupien | |
| 5,920,848 A * | 7/1999 | Schutzer | G06Q 20/10 |
| | | | 705/42 |
| 5,930,780 A * | 7/1999 | Hughes | H04L 67/34 |
| | | | 706/13 |
| 6,240,399 B1 * | 5/2001 | Frank | G06Q 40/04 |
| | | | 705/36 R |
| 6,249,783 B1 * | 6/2001 | Crone | G06F 16/24554 |
| | | | 707/999.005 |
| 6,941,287 B1 * | 9/2005 | Vaidyanathan | G06N 3/126 |
| | | | 706/14 |
| 7,013,344 B2 | 3/2006 | Megiddo | |
| 7,246,075 B1 * | 7/2007 | Testa | G06Q 10/06312 |
| | | | 705/7.22 |
| 7,370,013 B1 | 5/2008 | Aziz | |
| 7,444,309 B2 | 10/2008 | Branke | |
| 8,065,244 B2 | 11/2011 | Chen | |
| 8,364,519 B1 * | 1/2013 | Basu | G06Q 10/06393 |
| | | | 705/7.38 |
| 8,527,433 B2 | 9/2013 | Hodjat | |
| 8,639,545 B2 * | 1/2014 | Cases | G06Q 10/0633 |
| | | | 705/7.11 |
| 8,768,811 B2 | 7/2014 | Hodjat | |
| 8,775,341 B1 | 7/2014 | Commons | |
| 8,825,560 B2 | 9/2014 | Hodjat | |
| 8,909,570 B1 * | 12/2014 | Hodjat | G06N 3/126 |
| | | | 706/13 |
| 8,918,349 B2 | 12/2014 | Hodjat | |
| 8,977,581 B1 | 3/2015 | Hodjat | |
| 9,002,759 B2 | 4/2015 | Hodjat | |
| 9,015,093 B1 * | 4/2015 | Commons | G01C 21/3602 |
| | | | 706/26 |
| 9,053,431 B1 | 6/2015 | Commons | |
| 9,230,211 B1 * | 1/2016 | Basu | G06Q 10/063 |
| 9,466,023 B1 * | 10/2016 | Shahrzad | G06Q 10/0633 |
| 9,489,630 B2 * | 11/2016 | Achin | G06N 5/02 |
| 9,605,529 B1 * | 3/2017 | Venter | G06F 30/20 |
| 9,678,487 B1 * | 6/2017 | Basu | G06F 3/04847 |
| 9,785,886 B1 * | 10/2017 | Andoni | G06N 3/04 |
| 10,255,529 B2 | 4/2019 | Rabinovich | |
| 10,268,953 B1 * | 4/2019 | Fink | G06N 3/126 |
| 10,364,662 B1 * | 7/2019 | Basu | G01V 20/00 |
| 10,430,709 B2 | 10/2019 | Shahrzad | |
| 10,699,194 B2 * | 6/2020 | David | G06N 3/04 |
| 10,860,931 B1 * | 12/2020 | Venter | G06N 5/02 |
| 10,970,441 B1 * | 4/2021 | Zhang | G06N 3/063 |
| 11,003,997 B1 * | 5/2021 | Blackwood | G06N 20/00 |
| 11,087,261 B1 * | 8/2021 | Basu | G06Q 10/0639 |
| 2002/0019844 A1 | 2/2002 | Kurowski | |
| 2002/0080169 A1 * | 6/2002 | Diederiks | H04N 21/4755 |
| | | | 715/744 |
| 2003/0014379 A1 * | 1/2003 | Saias | G06Q 10/06 |
| | | | 706/45 |
| 2003/0149603 A1 * | 8/2003 | Ferguson | G06Q 30/06 |
| | | | 705/64 |
| 2003/0158887 A1 * | 8/2003 | Megiddo | G06F 9/5066 |
| | | | 709/201 |
| 2004/0143559 A1 * | 7/2004 | Ayala | G06N 3/086 |
| | | | 706/26 |
| 2004/0210545 A1 * | 10/2004 | Branke | G06N 3/126 |
| | | | 700/89 |
| 2004/0254901 A1 | 12/2004 | Bonabeau | |
| 2005/0033672 A1 * | 2/2005 | Lasry | G06Q 40/08 |
| | | | 705/35 |
| 2005/0136480 A1 * | 6/2005 | Brahmachari | G16B 40/00 |
| | | | 435/7.1 |
| 2005/0187848 A1 * | 8/2005 | Bonissone | G06Q 40/06 |
| | | | 705/36 R |
| 2005/0197875 A1 | 9/2005 | Kauffman | |
| 2005/0198103 A1 * | 9/2005 | Ching | G06Q 10/10 |
| | | | 709/200 |
| 2005/0256760 A1 * | 11/2005 | Siddhanti | G06Q 10/06315 |
| | | | 705/7.25 |
| 2006/0218107 A1 * | 9/2006 | Young | G05B 13/027 |
| | | | 706/13 |
| 2006/0247973 A1 * | 11/2006 | Mueller | G06Q 20/20 |
| | | | 705/26.1 |
| 2007/0094161 A1 | 4/2007 | Calabro | |
| 2007/0100907 A1 * | 5/2007 | Bayer | G06F 8/65 |
| | | | 707/999.203 |
| 2007/0143198 A1 * | 6/2007 | Brandes | G06Q 40/04 |
| | | | 705/36 R |
| 2007/0143759 A1 * | 6/2007 | Ozgur | G06F 9/5033 |
| | | | 718/102 |
| 2007/0150435 A1 * | 6/2007 | Murakawa | G06N 3/126 |
| 2007/0185990 A1 * | 8/2007 | Ono | G06F 11/3452 |
| | | | 709/224 |
| 2008/0071588 A1 * | 3/2008 | Eder | G06Q 30/02 |
| | | | 705/7.31 |
| 2008/0228644 A1 * | 9/2008 | Birkestrand | G06Q 20/102 |
| | | | 705/40 |
| 2009/0125370 A1 * | 5/2009 | Blondeau | G06Q 10/0633 |
| | | | 706/12 |
| 2009/0307638 A1 * | 12/2009 | McConaghy | G06F 30/36 |
| | | | 716/100 |
| 2009/0327178 A1 | 12/2009 | Jacobson | |
| 2010/0018293 A1 | 1/2010 | Monkowski | |
| 2010/0030720 A1 * | 2/2010 | Stephens | G06Q 40/06 |
| | | | 705/36 R |
| 2010/0111991 A1 | 5/2010 | Raitano | |
| 2010/0182935 A1 * | 7/2010 | David | G06F 15/173 |
| | | | 370/254 |
| 2010/0256795 A1 | 10/2010 | McLaughlin | |
| 2010/0257228 A1 * | 10/2010 | Staggs | G06F 9/5027 |
| | | | 700/7 |
| 2010/0257605 A1 * | 10/2010 | McLaughlin | H04L 63/1425 |
| | | | 726/22 |
| 2010/0274736 A1 * | 10/2010 | Hodjat | G06Q 40/04 |
| | | | 705/36 R |
| 2010/0274742 A1 * | 10/2010 | Hodjat | G06N 3/12 |
| | | | 706/13 |
| 2010/0293119 A1 * | 11/2010 | Ferringer | G06N 3/126 |
| | | | 712/31 |
| 2011/0040596 A1 * | 2/2011 | Chen | G06Q 50/04 |
| | | | 705/28 |
| 2011/0161264 A1 * | 6/2011 | Cantin | G06N 3/126 |
| | | | 706/13 |
| 2011/0246834 A1 * | 10/2011 | Rajashekara | G06F 11/3676 |
| | | | 714/E11.208 |
| 2012/0239517 A1 | 9/2012 | Blondeau | |
| 2012/0239592 A1 * | 9/2012 | Esbensen | G06Q 10/067 |
| | | | 705/36 R |
| 2012/0313798 A1 | 12/2012 | Markram | |
| 2013/0006901 A1 * | 1/2013 | Cantin | G06N 3/126 |
| | | | 706/13 |
| 2013/0124440 A1 * | 5/2013 | Hodjat | G06N 3/126 |
| | | | 706/13 |
| 2013/0132042 A1 * | 5/2013 | Chan | G06N 3/126 |
| | | | 703/1 |
| 2013/0138436 A1 * | 5/2013 | Yu | G06N 3/08 |
| | | | 704/E15.017 |
| 2013/0254142 A1 | 9/2013 | Hodjat | |
| 2013/0311412 A1 * | 11/2013 | Lazar | H03M 3/502 |
| | | | 706/16 |
| 2014/0006316 A1 | 1/2014 | Hodjat | |
| 2014/0011982 A1 * | 1/2014 | Marasco | C07K 14/005 |
| | | | 536/23.53 |
| 2014/0019388 A1 * | 1/2014 | Kingsbury | G06N 3/08 |
| | | | 706/12 |
| 2014/0229362 A1 | 8/2014 | Hodjat | |
| 2015/0046181 A1 * | 2/2015 | Adjaoute | G06Q 10/10 |
| | | | 705/2 |
| 2015/0136602 A1 * | 5/2015 | Jovanovich | B01L 3/502715 |
| | | | 204/601 |
| 2015/0242760 A1 | 8/2015 | Miao | |

(56) References Cited

U.S. PATENT DOCUMENTS

| | | | | |
|---|---|---|---|---|
| 2015/0288573 | A1* | 10/2015 | Baughman | H04L 41/145 |
| | | | | 706/52 |
| 2015/0331908 | A1* | 11/2015 | Duffy | G06F 16/93 |
| | | | | 707/765 |
| 2015/0356461 | A1* | 12/2015 | Vinyals | G06N 3/084 |
| | | | | 706/12 |
| 2016/0048753 | A1* | 2/2016 | Sussillo | G06N 3/044 |
| | | | | 706/23 |
| 2016/0063359 | A1* | 3/2016 | Szegedy | G06V 30/194 |
| | | | | 382/158 |
| 2016/0232445 | A1* | 8/2016 | Srinivasan | G06N 3/047 |
| 2016/0242690 | A1* | 8/2016 | Principe | A61B 5/316 |
| 2016/0283563 | A1 | 9/2016 | Hodjat | |
| 2016/0307071 | A1 | 10/2016 | Perronnin | |
| 2016/0328253 | A1* | 11/2016 | Majumdar | G06N 3/126 |
| 2016/0329047 | A1* | 11/2016 | Tur | G10L 13/08 |
| 2016/0329407 | A1 | 11/2016 | Takemura | |
| 2016/0350671 | A1* | 12/2016 | Morris, II | G05B 23/0229 |
| 2016/0364522 | A1* | 12/2016 | Frey | G16B 40/20 |
| 2017/0001093 | A1* | 1/2017 | Mollice | A63F 7/0672 |
| 2017/0060963 | A1* | 3/2017 | Whittaker | G06N 20/00 |
| 2017/0063908 | A1* | 3/2017 | Muddu | G06F 16/285 |
| 2017/0103172 | A1* | 4/2017 | Fink | G16H 50/20 |
| 2017/0109355 | A1 | 4/2017 | Li | |
| 2017/0116520 | A1* | 4/2017 | Min | G06N 3/08 |
| 2017/0132528 | A1 | 5/2017 | Aslan | |
| 2017/0148433 | A1* | 5/2017 | Catanzaro | G10L 25/18 |
| 2017/0192638 | A1 | 7/2017 | Iscoe | |
| 2017/0193366 | A1 | 7/2017 | Miikkulainen | |
| 2017/0193367 | A1 | 7/2017 | Miikkulainen | |
| 2017/0193403 | A1* | 7/2017 | Iscoe | G06F 16/26 |
| 2017/0213156 | A1* | 7/2017 | Hammond | G06F 8/31 |
| 2017/0256254 | A1* | 9/2017 | Huang | G10L 15/063 |
| 2017/0262737 | A1* | 9/2017 | Rabinovich | G06N 3/082 |
| 2017/0270225 | A1* | 9/2017 | Chen | G06F 16/00 |
| 2017/0293849 | A1* | 10/2017 | Hodjat | G06N 5/025 |
| 2017/0323219 | A1* | 11/2017 | Shahrzad | G06N 3/126 |
| 2017/0323636 | A1* | 11/2017 | Xiao | G06N 3/045 |
| 2018/0018590 | A1* | 1/2018 | Szeto | G16H 50/20 |
| 2018/0053092 | A1* | 2/2018 | Hajizadeh | G06N 3/045 |
| 2018/0114115 | A1 | 4/2018 | Liang | |
| 2018/0114116 | A1* | 4/2018 | Liang | G06N 3/04 |
| 2018/0157972 | A1* | 6/2018 | Hu | G06V 20/56 |
| 2018/0240041 | A1* | 8/2018 | Koch | G06N 3/126 |
| 2018/0293498 | A1 | 10/2018 | Campos | |
| 2018/0357552 | A1* | 12/2018 | Campos | G06N 5/043 |
| 2018/0357566 | A1* | 12/2018 | Liu | G06N 7/01 |
| 2018/0365557 | A1* | 12/2018 | Kobayashi | G06N 3/126 |
| 2018/0365564 | A1* | 12/2018 | Huang | G06N 3/045 |
| 2019/0065954 | A1* | 2/2019 | Bittner, Jr. | G06N 3/08 |
| 2019/0147298 | A1* | 5/2019 | Rabinovich | G06F 18/217 |
| | | | | 382/157 |
| 2019/0244108 | A1* | 8/2019 | Meyerson | G06N 3/044 |
| 2019/0332678 | A1* | 10/2019 | Ishida | G06F 40/279 |
| 2020/0311556 | A1* | 10/2020 | Francon | G06N 3/042 |
| 2021/0004676 | A1* | 1/2021 | Jaderberg | G06N 3/086 |
| 2021/0097443 | A1* | 4/2021 | Li | G06N 5/04 |
| 2021/0312297 | A1* | 10/2021 | Francon | G06Q 10/0637 |
| 2022/0027744 | A1* | 1/2022 | Krishnan | G06Q 10/06315 |
| 2022/0027837 | A1* | 1/2022 | D'Attilio | H04M 3/5175 |
| 2022/0326923 | A1* | 10/2022 | Prashanth | G06F 8/10 |

FOREIGN PATENT DOCUMENTS

| | | |
|---|---|---|
| EP | 2422278 A1 | 2/2012 |
| JP | H0810804 | 1/1996 |
| JP | H08110804 | 4/1996 |
| JP | H09114797 A | 5/1997 |
| JP | 2001325041 A | 11/2001 |
| JP | 2003044665 A | 2/2003 |
| JP | 2004240671 A | 8/2004 |
| JP | 2004302741 A | 10/2004 |
| JP | 2005190372 A | 7/2005 |
| JP | 2007052247 | 3/2007 |
| JP | 2007207173 A | 8/2007 |
| JP | 2007522547 A | 8/2007 |
| JP | 2008129984 A | 6/2008 |
| WO | 2005073854 A2 | 8/2005 |
| WO | 2010120440 A2 | 10/2010 |
| WO | 2010127039 | 11/2010 |
| WO | 2010127042 | 11/2010 |
| WO | 2017161233 | 9/2017 |
| WO | 2018211138 | 11/2018 |
| WO | 2018213840 | 11/2018 |
| WO | 2018223822 A1 | 12/2018 |
| WO | 2019081705 | 5/2019 |
| WO | 2019217876 | 11/2019 |

OTHER PUBLICATIONS

Open Ai: "Deep Deterministic Policy Gradient—Spinning Up documentation", Nov. 12, 2018, URL: https://web.archive.org/web/20181112044227/https://spinningup.openai.com/en/latest/algorithms/ddpg.html [retrieved on Feb. 15, 2023], 7 pages.

Tobias Peter: "Using Deep Learning as a surrogate model in Multi-objective Evolutionary Algorithms", Jan. 1, 2018, URL:https://www.ci.ovgu.de/is_media/Master+und+Bachelor_Arbeiten/MasterThesis_TobiasPeter-download-p-4614.pdf [retrieved on Feb. 14, 2023], 115 pages.

Extended European Search Report issued in App. No. EP20778409.1 on Feb. 27, 2023, 11 pages.

Oehmcke et al., "Knowledge Sharing for Population Based Neural Network Training," Springer (2018) (Year: 2018).

Ma et al., A multi-population differential evolution with best-random mutation strategy for large-scale global optimization (Jan. 2020) (Year: 2020).

E. Meyerson and R. Miikkulainen, "Beyond Shared Hierarchies: Deep Multitask Learning Through Soft Layer Ordering," ICLR, 14 pages, 2018.

Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.

Erwan Le Merrer, et al., "The Bouncer Problem: Challenges to Remote Explainability," https://arxiv.org/pdf/1910.01432.pdf, 2020. 14 pages.

Esparcia-Alcazar et al. "Evolving Recurrent Neural Network Architectures by Genetic Programming", 1997, pp. 6, https://citeseerx.ist.psu.edu/viewdoc/download?doi=10.1.1.40.226&rep=rep1&type=pdf.

European Parliamentary Research Service, "Understanding Algorithmic Decision-Making: Opportunities and Challenges," https://www.europarl.europa.eu/RegData/etudes/STUD/2019/624261/EPRS_STU(2019)624261_EN.pdf, 2019. 104 pages.

Exam Report for related application AU 2008323758, dated Apr. 20, 2012, 2 pp.

Extended EP SR for EP 08847214 dated Nov. 26, 2012 , 9 pp.

Fernando et al., "Pathnet: Evolution channels gradient descent in super neural networks," arXiv preprint arXiv:1701.08734 (2017), 16 pages.

Fidelis, Marcos Vinicius, Heitor S. Lopes, and Alex A. Freitas, "Discovering Comprehensible Classification Rules With a Genetic Algorithm," 6 pages, Proceedings of the 2000 Congress on Evolutionary Computation, vol. 1, IEEE, 2000.

Fitzpatrick, J.M. etal., "GeneticAlgorithms in Noisy Environments," Machine Learning 3: 101-120, May 1988.

Freitas, A. "A review of evolutionary algorithms for data mining." Soft Computing for Knowledge Discovery and Data Mining. Springer US, 2008. 79-111.

Galea, "Iterative vs Simultaneous Fuzzy Rule Induction", IEEE, 2005 (Year: 2005). 6 pages.

Garcia-Pedrajas et al., "COVNET: A Cooperative Coevolutionary Model for Evolving Artificial Neural Networks", IEEE Transactions on Neural Networks, vol. 14, No. 3, (2003). (Year: 2003) 22 pages.

Garcia-Pedrajas, et al., "Cooperative Coevolution of Artificial Neural Network Ensembles for Pattern Classification," IEEE Transactions on Evolutionary Computation, vol. 9, No. 3, 32 pages, Jun. 3, 2005.

(56) References Cited

OTHER PUBLICATIONS

Garcia-Pedrajas, et. al., "Cooperative-Coevolution-of-Artificial-Neural-Networks", 2005, 32 pages.
Gaspar-Cunha, A., et al, "A Multi-Objective Evolutionary Algorithm Using Neural Networks to Approximate Fitness Evaluations," Int'l. J. Computers, Systems and Signals, 6(1), pp. 18-36, 2005.
Gaurav Kumar Nayak, et al., "Zero-Shot Knowledge Distillation in Deep Networks," arXiv: 1905.08114v1, May 20, 2019, 17 pp.
Georgilakis, P.S. "Genetic Algorithm Model for Profit Maximization of Generating Companies in Deregulated Electricity Markets", Applied Artificial Intelligence, Jul. 2009, 23:6,538-552.
Golovin, e tal., "Google Vizier: A Service for Black-Box Optimization," Proceedings of the 23rd ACM SIGKDD International Conference on Knowledge Discovery and Data Mining, pp. 1487-1495, 2017.
Gomes et al., "Devising Effective Novelty Search Algorithms: A Comprehensive Empirical Study," Madrid, Spain, Copyright Jul. 11-15, 2015, ACM, 8 pages.
Gomes et al., "Evolution of Swarm Robotics Systems with Novelty Search," published in Swarm Intelligence, vol. 7, Issue 2, ANTS Special Issue, Copyright Sep. 2013, pp. 115-144.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv:2002.00059v3), Jun. 6, 2020, 13 pages.
Goodman, et al., "European Union (EU) regulations on algorithmic decision-making and a right to explanation," arXiv: 1606.08813v3, Aug. 2016, 9 pages.
Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.
Gorunescu, et al., "Evolutionary strategy to develop learning-based decision systems, Application to breast cancer and liver fibrosis stadiallization" [online], Jun. 2014 [retrieved on May 21, 2020], Journal of Biomedical Informatics, vol. 49, pp. 1-32, Retrieved from the Internet: https://reader.elsevier.com/reader/sd/pii/S1532046414000173?token=E3DB70CBA3796F0A3C0B08ABA8E0657EED29D4423C65CF9959714AC34AD580F5755F248C38C14CEBE69D726C456A820.
Gupta et al., "An Overview of methods maintaining Diversity in Generic Algorithms," International Journal of Emerging Technology and Advanced Engineering, vol. 2, Issue 5, New Delhi, India, May 2012, pp. 56-60.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Ha, D. and Schmidhuber, Jr., "Recurrent World Models Facilitate Policy Evolution," in Advances in Neural Information Processing Systems 32 (NIPS '18), Curran Associates, Inc., Red Hook, NY, USA, pp. 2455-2467, 2018.
Haitong Li, "Exploring Knowledge Distillation of Deep Neural Networks for Efficient Hardware Solutions," CS 230 Final Report, Department of Electrical Engineering, Stanford, CA, 6 pp., 2018.
Hansen, et al., "Completely derandomized self-adaptation in evolution strategies," Evolutionary Computation, vol. 9, No. 2, pp. 159-195, 2001.
Hanting Chen, et al., "Data-Free Learning of Student Networks," arXiv: 1904.01186v4, Dec. 31, 2019, 9 pp.
Hasselt, H. V., "Double Q-learning," in Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.
Hodjat et al., "Maintenance of a Long Running Distributed Genetic Programming System for Solving Problems Requiring Big Data", in: Riolo et al., Genetic Programming Theory and Practice XI, Mar. 10, 2014, Genetic and Evolutionary Computation, pp. 65-83 (Year: 2014).
Hodjat et. al., "nPool: Massively Distributed Simultaneous Evolution and Cross-Validation in EC-Star", ppt at GPTP May 2015, 16 pages.
Hodjat, B. et al., "PRETSL: Distributed Probabilistic Rule Evolution for Time-Series Classification," in Genetic Programming Theory and Practice XIV. Springer, 139-148 (2018).
Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.
Hornby, "The Age-Layered Population Structure (ALPS) Evolutionary Algorithm," GECCO '19, Jul. 8-12, 2009, 7 pages.
Hornby, "ALPS: The Age-Layered Population Structure for Reducing the Problem of Premature Convergence," GECCO '06, Seattle, WA, Jul. 2006, 8 pp.
Hornby, G. S. "A Steady-State Version of the Age-Layered Population Structure EA," Chapter 1 of Genetic Programming Theory and Practice VII, Riolo, et al., editors, Springer 2009, 16 pp.
Hornby, G. S., "Steady-State ALPS for Real-Valued Problems," GECCO '09, Montreal, Jul. 2009, Assoc. of Computing Machinery, 8 pp.
Houthooft, R., Chen, Y., Isola, P., Stadie, B., Wolski, F., Ho, O. J., and Abbeel, P., "Evolved policy gradients," in Advances in Neural Information Processing Systems 31, Curran Associates, Inc., pp. 5400-5409, 2018.
Idesign lab, "ALPS—the Age-Layered Population Structure," UC Santa Cruz web article printed Mar. 17, 2011, 3 pp. (http://idesign.ucsc.edu/projects/alps.html).
Ilya Loshchilov, "Surrogate-Assisted Evolutionary Algorithms," https://tel.archives-ouvertes.fr/tel-00823881/document, 2013. 264 pages.
International Preliminary Report on Patentability for PCT App. PCT/US2019/061198,dated Nov. 18, 2020, 24 pp.
International Search Report and Written Opinion for Application No. PCT/US2018/064520, dated Mar. 4, 2019. 8 pages.
International Search Report and Written Opinion for PCT App. No. PCT/US19/61198,dated Mar. 11, 2020, 15 pp.
International Search Report and Written Opinion for PCT App. No. PCT/US20/25046, dated Jun. 23, 2020, 9 pp.
Risto Miikkulainen, "Creative AI Through Evolutionary Computation: Principles and Examples," SN Computer Science, 2:163, 2021, https://do1.org/10,1007/s42979-021 - 00540-9, 7 pp.
Risto Miikkulainen, "From Prediction to Prescription: Evolutionary Optimization of Non-Pharmaceutical Interventions in the COVID-19 Pandemic," arXiv: 2005.13766v3, Aug. 1, 2020, 34 pp.
Risto Miikkulainen, et al., "From Prediction to Prescription: Evolutionary Optimization of Nonpharmaceutical Interventions in the COVID-19 Pandemic," IEEE Transactions on Evolutionary Computation, vol. 25, No. 2, Apr. 2021, 16 pp.
International Search Report and Written Opinion issued in App. No. PCT/US2022/032656, mailing date Nov. 4, 2022, 9 pages.
Francon et al., "Effective Reinforcement Learning through Evolutionary Surrogate-Assisted Prescription", ACM, Jul. 12, 2020, retrieved on [Oct. 11, 2022]. Retrieved from the internet <URL: https://dl.acm.org/doi/pdf/10.1145/3377930.3389842>.
Miikkulainen et al., "From Prediction to Prescription: Evolutionary Optimization of Non-Pharmaceutical Interventions In the COVID-19 Pandemic", arxiv.org, Aug. 1, 2020, retrieved on [Oct. 11, 2022]. Retrieved from the internet <URL: https://arxiv.org/pdf/2005.13766.pdf>.
Robinet et al ("Inducing High-Level Behaviors from Problem-Solving Traces Using Machine-Learning Tools" 2007) (Year: 2007).
Yao & Islam, 2008, "Evolving Artificial Neural Network Ensembles" (Year: 2008).

(56) References Cited

OTHER PUBLICATIONS

International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US18/66610, dated Apr. 15, 2019, 8 pp.
International Search Report and Written Opinion for PCT Application No. PCT/US2008/82876, Dec. 23, 2008, 8 pp.
International Search Report and Written Opinion for PCT Application No. PCT/US2019/017175, dated Jun. 5, 2019, 10 pp.
International Search Report mailed Jul. 2, 2010 in PCT/US 10/32847, 3 pages.
International Search Report mailed Jun. 29, 2010 in PCT/US 10/32841, 3 pages.
Ishibuchi, "Three-objective genetics-based machine learning for linguistic rule extraction", IEEE, 2005 (Year: 2005). 25 pages.
J. Z. Liang, et al., "Evolutionary Architecture Search for Deep Multitask Networks," GECCO, 2018.
J.T. Barron, "A General and Adaptive Robust Loss Function," arXiv: 1701.03077, 2018, 19 pages.
Jaemin Yoo, et al., "Knowledge Extraction With No Observable Data," 33rd Conference on Neural Information Processing Systems (NeurIPS 2019), Vancouver, Canada, 2019, 10 pp.
Jakob Bossek, et al., "One-Shot Decision-Making With and Without Surrogates," https://arxiv.org/pdf/1912.08956v1.pdf, 2019. 8 pages.
James Bradbury, et al., "Quasi-Recurrent Neural Networks," arXiv:1611.01576v2, Nov. 21, 2016, 11 pp.; Retrieved from the Internet: https/arxiv.org/pdf/1611.01576.pdf?fbclid=1wAR3hreOvBGmJZe54-631X49XedcbsQoDYIRu87BcCHEBf_vMKF8FDKK_7Nw.
Jason Liang, et al., "Evolutionary Neural AutoML for Deep Learning," GECCO '19, Jul. 13-17, 2019, Prague, Czech Republic (https:/arxiv.org/pdf/1902.06827.pdf).
Jee-weon Jung, et al, "Distilling the Knowledge of Specialist Deep Neural Networks in Acoustic Scene Classification," Detection and Classification of Acoustic Scenes and Events 2019, New York, New York, Oct. 25-26, 2019, 5 pp.
Ji Wang, et al., "Private Model Compression via Knowledge Distillation," arXiv: 1811.05072vl, Nov. 13, 2018, 9 pp.
Johnson et al., "Flavor-Cyber-Agriculture: Optimization of plant metabolites in an open-source control environment through surrogate modeling," PLoS One (2019), https://doi.org/10.1371/journal.pone.0213918. 16 pages.
JP 2010-533295—Office Action, dated Apr. 16, 2013, 3 pp. (English translation). 3 pages.
JP 2010-533295, Office Action dated Apr. 16, 2013, 3 pages.
JP 2012-508660—Office Action dated Apr. 1, 2014, 8 pages.
JP 2012-508663—Office Action dated Apr. 1, 2014, 6 pages.
Juille, H., "Evolution of Non-Deterministic Incremental Algorithms as a New Approach for Search in State Spaces, Proc. 6th Int'l. Conf. on Genetic Algorithms," 1995 8 pp.
Jul. 27, 2012 Final Office Action in U.S. Appl. No. 12/267,287, 14 pp.
Julian G. Zilly, Rupesh Kumar Srivastava, Jan ICoutnik, and Jurgen Schniidhuber, "Recurrent Hiehwav Networks." CORR abs/1607.03474. 2016 (Arxiv: 1607.03474} 13 pages.
Jun. 16, 2011 Written Opinion from Singapore Patent Office in related application SG 201003127—68 pp.
Jun. 16, 2011 Written Opinion from Singapore Patent Office in related application SG 201093127-6, 9 pp.
K. Janocha and W. M. Czarnecki, "On Loss Functions for Deep Neural Networks in Classification," arXiv: 1702.05659, 10 pages, 2017.
Kaelbling, et al, Reinforcement Learning: A Survey [online], 1996 [retrieved May 21, 2020], Journal of Artificial Intelligence Research, vol. 4, pp. 237-285. Retrieved from the Internet: https://www.cs.emu.edu/~tom/l0701 spl1/slides/Kaelbling.pdf.
Kang, Zhuoliang, et al., "Learning With Whom to Share in Multi-Task Feature Learning," Proceedings of the 28th International Conference on Machine Learning, Bellevue, WA, USA, 2011, 8 pp.

Kenneth O. Stanley and Risto Miikkulainen, "Evolving Neural Networks Through Augmenting Topologies," Evolutionary Computation, 10(2):99-127, 2002.
Khadka, et al., "Evolution-Guided Policy Gradient in Reinforcement Learning," 32nd Conference on Neural Information Processing Systems, 2018. 13 pages.
Kipfer et al., "UberFlow: A GPU-Based Particle Engine," Computer Graphics and Visualization, The Eurographics Association, Copyright 2004, 9 pages.
Kosorukoff, A. "Using incremental evaluation and adaptive choice of operators in a genetic algorithm," Proc. Genetic and Evolutionary Computation Conference, GECCO—Sep. 2002, 7pp.
Koza, J.R., "Genetic Programming: On the Programming of Computers by Means of Natural Selection", 1992, MIT Press pp. 1-609.
Krcah, P., et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Kwedlo, "Learning Decision Rules Using a Distributed Evolutionary Algorithm", 2002 (Year: 2002). 10 pages.
Lahsasna, "Design of a Fuzzy-based Decision Support System for Coronary Heart Disease Diagnosis", (Year: 2012). 14 pages.
Laumanns, Marco, et al., "A Unified Model for Multi-Objective Evolutionary Algorithms with Elitism," IEEE, pp. 46-53, 2000.
Lee, Chi-Ho, et al., "Evolutionary ordered neural network with a linked-list encoding scheme," Proceedings of IEEE International Conference on Evolutionary Computation, IEEE, 5 pages, 1996.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Abandoning Objectives: Evolution through the Search for Novelty Alone," Evolutionary Computation journal, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.
Lehman et al., "Extinction Events Can Accelerate Evolution," PLoS One, journal.pone.0132886, Aug. 12, 2015, 16 pages.
Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, ACM, Copyright 2010, 8 pages.
Lehman, Joel, et al., "Exploiting Open-Endedness to Solve Problems Through the Search for Novelty," ALIFE, 8 pages, 2008.
Leon, C. et al., 'Parallel hypervolume-guided hyperheuristic for adapting the multi-objective evolutionary island model', NICSO 2008, Studies in Computational Intelligence, Nov. 12, 2008, vol. 236pp. 261-272.
Li, Xiaodong, and Michael Kirley. "The effects of varying population density in a fine-grained parallel genetic algorithm." Evolutionary Computation, 2002. CEC'02. 6 pages. Proceedings of the 2002 Congress on. vol. 2. IEEE2002.
Liang, et al, "Population-Based Training for Loss Function Optimization," 10 pages, arXiv:2002.04225vl (Feb. 11, 2020).
CS412 KL-divergence, computer science, Illinois university. 2017 (Year: 2017).
Lin Wang, et al., "Knowledge Distillation and Student-Teacher Learning for Visual Intelligence: A Review and New Outlooks," Journal of Latex Class Files, vol. 14, No. 8, Apr. 2020, 38 pp., arXiv: 2004/05937v3, May 4, 2020.
Lopez Haimes et al., "MRMOGA: parallel evolutionary multi-objective optimization using multiple resolutions," in: Proceedings of IEEE Congress on Evolutionary Computation, 2294-2301, 2005.

(56) References Cited

OTHER PUBLICATIONS

Mahmoudpour et al., Diagnosis of Distributed Denial of Service Attacks using the Combination Method of Fuzzy Neural Network and Evolutionary Algorithm, Indian Journal of Science and Technology, vol. 8(28), DOI: 10.17485/ijst/2015/v8i28/81820, Oct. 2015; pp. 1-7 (Year: 2015).

Maribel Lopez, "Preparing for AI Ethics and Explainability in 2020," https://www.forbes.com/sites/maribellopez/2020/01/21/preparing-for-ai-ethics-and-explainability-in-2020/#15b37b022f6e, 2020. 7 pages.

Meyerson, E. et la., Discovering evolutionary stepping stones through behavior domination, in Proceedings of the Genetic and Evolutionary Computation Conference (GECCO 2017). 8 pages.

Meyerson, Elliot, "Discovering Multi-Purpose Modules Through Deep Multitask Learning," Dissertation Presented to the Faculty of the Graduate School of the University of Texas at Austin, Dec. 2018, 275 pp.

Meyerson, et al., "Pseudo-Task Augmentation: From Deep Multitask Learning to Intratask Sharing and Back," arXiv: 1803.04062, 10 pages, 2018.

Miikkulainen et al., Ascend by Evolv: AI-Based Massively Multivariate Conversion Rate Optimization, AI Magazine (2020). 16 pages.

Miikkulainen, R. et al., Sentient ascend: AI-based massively multivariate conversion rate optimization, in Proceedings of the Thirtieth Innovative Applications of Artificial Intelligence Conference. AAAI (2018). 8 pages.

Miikkulainen, Risto, et al., "Evolving Deep Neural Networks," Mar. 4, 2017, 8 pp.

Minsoo Kang, et al., "Towards Oracle Knowledge Distillation With Neural Architecture Search," arXiv: 1911.13019vl, Nov. 29, 2019, 9 pp.

Misra et al., "Cross-stitch networks for multi-task learning," in Proceedings of the IEEE Conference on Computer Vision and Pattern Recognition, pp. 3994-4003. 2016.

Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.

Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.

Moriarty etal., "Hierarchical Evolution of Neural Networks", IEEE (1998). (Year: 1998) 6 pages.

Moriarty, David E., et al., "Forming neural networks through efficient and adaptive coevolution," Evolutionary Computation 5.4, 28 pages, 1997.

Mouret, J. B., et al., "Encouraging Behavioral Diversity in Evolutionary Robotics: An Empirical Study," MIT, Evolutionary Computation, 20(1):91-133, 2012.

Myers, R.N. and Montgomery, D.C., "Response Surface Methodology: Process and Product Optimization Using Designed Experiments," New York: John Wiley and Sons, Inc., 1995pp. 1-700.

N. Hansen, et al, "Adapting arbitrary normal mutation distributions in evolution strategies: The covariance matrix adaptation," in Proceedings of IEEE International Conference on Evolutionary Computation, pp. 312-317, IEEE, 1996.

N. Hansen, et al., "Evaluating the CMA evolution strategy on multimodal test functions," International Conference on Parallel Problem Solving from Nature, Springer, pp. 282-291, 2004.

Nelson, A., "Fitness Functions in Evolutionary Robotics: A Survey and Analysis," Robotics and Autonomous Systems 67, 2009, 345-370.

Notice of Allowance for U.S. Appl. No. 13/358,381, dated Nov. 19, 2014, 5 pp.

Notice of Allowance for U.S. Appl. No. 13/540,507, dated Oct. 31, 2014, 9 pp.

O'Reilly et al., "EC-Star: A Massive-Scale, Hub and Spoke, Distributed Genetic Programming System", in: Riolo etal, Genetic Programming Theory and Practice X, Apr. 19, 2013, Genetic and Evolutionary Computation, pp. 73-85 (Year: 2013).

Oreski et al., Hybrid system with genetic algorithm and artificial neural networks and its application to retail credit risk assessment, Expert Systems with Applications 39 (2012); pp. 12605-12617 (Year: 2012).

Pantridge et al., Evolution of Layer Based Neural Networks: Preliminary Report, GECCO '16, pp. 1015-1022, Jul. 2016. (Year: 2016).

Paul Micaelli, et al., "Zero-Shot Knowledge Transfer via Adversarial Belief Matching," 33rd Conference on Neural Information Processing Systems, (NEURIPS 2019), Vancouver, CA, arXiv: 1905.09768v4, Nov. 25, 2019, 13 pp.

Poli R et al., "Genetic Programing: An introductory Tutorial and a Survey of Techniques and Applications," Univ. Essex School of Computer Science and Eletronic Engineering Technical Report No. CES-475, Oct. 2007, 112 pp.

Pourchot, et al., "CEM-RL: Combining Evolutionary and Gradient-Based Methods for Policy Search," ICLR, 2019. 18 pages.

Pouya Bashivan, et al., "Teacher Guided Architecture Search," arXiv: 1808.01405v3, Sep. 6, 2019, 15pp.

Qiu, X. et al., "Quantifying Point-Prediction Uncertainty in Neural Networks via Residual Estimation with an I/O Kernel," in Proceedings of the Eighth International Conference on Learning Representations (ICLR) (2020). 35 pages.

R. Miikkulainen, J. Liang, E. Meyerson, et al., 2017, "Evolving Deep Neural Networks," CoRR, abs/1703.00548, Mar. 2017. 73 pages.

R. Poli, W. B. Langdon, N. F. McPhee, J. R. Koza, "Genetic programming: An introductory tutorial and a survey of techniques and applications", University of Essex, School of Computer Science and Electronic Engineering, Technical Report, (Oct. 2007), No. CES-475, ISSN 1744-8050, XP055038163.

Raphael Gontijo Lopes, et al., "Data-Free Knowledge Distillation for Deep Neural Networks," arXiv: 1710.07535v2, Nov. 23, 2017, 8 pp.

Refaeilzadeh, P., et al., "Cross Validation," entry, Encyclopedia of Database Systems, eds. Ozsu and Liu, Springer, 2009, 6 pp.

Remde et al. "Evolution of Fitness Functions to Improve Heuristic Performance," LION Dec. 8-10, 2007 II, LNCS 5313 pp. 206-219.

Rennie, Annealed dropout training of deep networks, 2014 IEEE Spoken Language Technology Workshop (SLT) 2014 (Year: 2014) 6 pages.

Riccardo Guidotti, et al., "A Survey of Methods for Explaining Black Box Models," https://dl.acm.org/doi/fullHtml/10.1145/3236009, 2018. 45 pages.

Risto Miikkulaiiien, "Evolving Multitask Neural Network Structure," The University of Texas at Austin and Sentient Technologies. Inc . Aug. 26, 2013, 22 pages.

Risto Miikkulainen, "Creative AI Through Evolutionary Computation," arXiv: 1901.03775v2, Feb. 22, 2020, 3 pages.

Rosenbaum, et al., "Routing Networks: Adaptive Selection of Non-Linear Functions for Multi-Task Learning," in: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.

Ruder,"An Overview of Multi-Task Learning in Deep Neural Networks," in: Cornell University Library /Computer Science/Machine Learning, Jun. 15, 2017 [online] [retrieved on Mar. 15, 2019], Retrieved from the Internet: https://arxrv.org/abs/1706.05098, 14 pages.

Sacks et al., "Design and Analysis of Computer Experiments," Statistical Science 4:4, 1989, 409-435.

Sakauchi et al., UNIFINE: A Next Generation Financial Solution System of Nihon Unisys Ltd., Technology Review UNISYS,' Japan, Nihon Unisys Ltd., Feb. 28, 2006, vol. 25, No. 4pp. 14-15.

Salami et al., "A fast evaluation strategy for evolutionary algorithms," Applied Soft Computing 2/3F (Jan. 2003) 156-173.

Salge, C., et. al, "Empowerment—An Introduction," published in Guided Self-Organization: Inception, Chap 4, University of Hertfordshire, Copyright 2014, pp. 67-114.

Sanchez, "Advocating the Use of Imprecisely Observed Data in Genetic Fuzzy Systems", IEEE, 2007 (Year: 2007). 12 pages.

(56) References Cited

OTHER PUBLICATIONS

Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"Revisiting Knowledge Distillation: A Teacher-Free Framework," ICLR 2020, 15 pp.
"CS 224D: Deep Learning for NLP, Lecture Notes: Part III". 14 pp., Spring, 2016.
Jun. 22, 2011 Office Action in U.S. Appl. No. 12/267,287, 16 pp.
Aug. 1, 2012 Office Action in U.S. Appl. No. 13/443,546, 12 pp.
Aditya Rawal and Risto Miikkulainen, "From Nodes to Networks: Evolving Recurrent Neural Networks," GECCO '18, Jul. 15-19, 2018, 8 pages, Kyoto, Japan.
Ahn, Chang Wook, et al., "Elitism-Based Compact Genetic Algorithm," IEEE, Transactions on Evolutionary Computation, vol. 7, No. 4, pp. 367-385, 2003.
Ajjad Abbasi, et al., "Modeling Teacher-Student Techniques in Deep Neural Networks for Knowledge Distillation," Computer Science, 2020 International Conference on Machine Vision and Image Processing (MVTP), 2020, 6 pp.
Akbarzadeh et al., "Friendship Modeling for Cooperative Co-Evolutionary Fuzzy Systems: A Hybrid GA-GP Algorithm," Proc. 22nd Int'l Conf. ofN. American FIPS, Jul. 2003, pp. 61-66.
Al-Haj Baddar, "Finding Better Sorting Networks," Dissertation to Kent State University for PhD, May 2009, 86 pages.
Alain Chabrier, IBM, "Explaining Decision Optimization Prescriptions," https://medium.com/ibm-watson/explaining-decision-optimization-prescriptions-7103abbc44e5, 2019. 8 pages.
Alan Diaz-Manriquez, et al., "A Review of Surrogate Assisted Multiobjective Evolutionary Algorithms," http://downloads.hindawi.com/journals/cin/2016/9420460.pdf, 2016. 15 pages.
Alejandro Barredo Arrietz, et al., "Explainable Artificial Intelligence (XAI): Concepts, Taxonomies, Opportunities and Challenges Toward Responsible AI," https://arxiv.ors/pdfl910,10045.pdf 2019, 72 pages.
Alesawy et al., Elliptic Curve Diffie-Hellman Random Keys Using Artificial Neural Network and Genetic Algorithm for Secure Data over Private Cloud, Inform. Technol. J., 15 (3): 77-83, 2016 (thru ResearchGate); Total pp. 9 (Year: 2016).
Alex Castrounis, Innoarchtech, "Production vs. Development AI and Machine Learning," published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
Anooj, "Clinical decision support system: Risk level prediction of heart disease using weighted fuzzy rules", 2012 (Year: 2012). 14 pages.
Application as filed for U.S. Appl. No. 16/424,686, filed May 29, 2019.
Application as filed for U.S. Appl. No. 16/502,439, filed Jul. 3, 2019.
Application as filed for U.S. Appl. No. 16/879,934, filed May 21, 2020.
Ares "A soft computing framework for classifying time series based on fuzzy sets of events", 2015 (Year: 2015). 20 pages.

Atin Sood, et al., "NEUNETS: An Automated Synthesis Engine for Neural Network Design," arXiv: 1901.06261vl, Jan. 17, 2019, 14 pp.
AU 2010241594—Examination Report dated Oct. 8, 2013, 3 pages.
AU 2010241597—Examination Report dated Nov. 4, 2013, 4 pages.
Barret Zoph, et al, "Neural Architecture Search With Reinforcement Learning," arXiv: 1611.01578v2, Feb. 15, 2017, 16 pp.
Bartlett II, J. E., et al., "Organizational Research: Determining Appropriate Sample Size in Survey Research," IT, Learning, and Performance Journal, 19(1), Spring 2001, 8 pp.
Berg "Fuzzy Classification Using Probability-Based Rule Weighting", IEEE, 2002 (Year: 2002). 6 pages.
Bergstra, et al., (2013), "Hyperopt: A Python Library for Optimizing the Hyperparameters of Machine Learning Algorithms," Proceedings of the 12th Python in Science Conference (SCIPY 2013).
Bilen et al. "Integrated Perception with Recurrent Multi-Task Neural Networks", NIPS, 2016, pp. 9.
Bilen,et al.,"Integrated perception with Reccurrent Multi-Task Neural Networks," NIPS 2016 ,9 pp.
Blen M. Keneni, "Evolving Rule Based Explainable Artificial Intelligence for Decision Support System of Unmanned Aerial Vehicles," Evolving Rule Based Explainable Artificial Intelli.pdf, 2018, 112 pages.
Bongard et al., "Guarding Against Premature Convergence while Accelerating Evolutionary Search," Proc. 12th annual conf. of Genetic and evolutionary computation, Jul. 2010, 8 pages.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723.1883738, (Mar. 15, 2019), XP019146179.
Bredeche, Nicolas, et al., "On-line, on-board evolution of robot controllers," International Conference on Artificial Evolution, Springer, Berlin, Heidelberg, 13 pages, 2009.
Bui, L.T. et al., "Local models: An approach to distributed multiobjective optimization," Computational Optimization and Applications, vol. 42, No. I, Jan. 2009, pp. 105-139.
Caruana, R. Multitask learning. In Learning to learn, pp. 95-133. Springer US, 1998, (Year: 1998).
Castillo Tapia M.G. et al., "Applications of multi-objective evolutionary algorithms in economics and finance: A survey," Proc. IEEE Congress on Evolutionary Computation, Sep. 2007, pp. 532-539.
Chenglin Yang, et al., "Snapshot Distillation: Teacher-Student Optimization in One Generation," arXiv: 1812.00123vl, Dec. 1, 2018, 10 pp.
Cynthia Rudin, "Stop Explaining Black Box Machine Learning Models for High Stakes Decision and Use Interpretable Models Instead," https://www.nature.com/articles/s42256-019-0048-x, 2019.
Davarynejad et al., "A Novel General Framework for Evolutionary Optimization: Adaptive Fuzzy Fitness Granulation," CEC Sep. 2007, 6 pp.
Davarynejad, "Fuzzy Fitness Granulation in Evolutionary Algorithms for complex optimization," Master of Science Thesis, Ferdowsi Univ. of Mashhad, Jun. 2007, 30 pages.
Deb, et al., "A fast and elitist multiobjective genetic algorithm: NSGA-II," IEEE Transactions on Evolutionary Computation, 6(2), 2002, pp. 182-197.
Derrick Mwiti, "Research Guide: Model Distillation Techniques for Deep Learning" [online], Nov. 20, 2019 [retrieved on Oct. 5, 2020], 17 pp., Retrieved From the Internet: https://heartbeat.fritz.ai/research-guide-model-distillation-techniques-for-deep-learmng-4al00801c0eb.
Devin, Coline, et al., "Learning Modular Neural Network Policies for Multi-Task and Multi-Robot Transfer," arXiv: 1609.07088vl, Sep. 22, 2016, 8 pp.
Di Gao, et al., "Private Knowledge Transfer via Model Distillation with Generative Adversarial Networks," arXiv: 2004.0463lvl, Apr. 5, 2020, 8 pp.
Diesenroth, M. and Rasmussen, C. E., "PILCO: A model-based and data-efficient approach to policy search," in Proceedings of the 28th International Conference on Machine Learning (ICML) (ICML '11), pp. 465-472, 2011.

(56) References Cited

OTHER PUBLICATIONS

Dong, "Multi-Task Learning for Multiple Language Translation," in Proc. of ACL, pp. 1723-1732, 2015.
Ducheyne, E. et al., "Is Fitness Inheritance Useful for Real-World Applications?" Evolutionary Multi-Criterion Optimization, ser. LNCS 2631, 2003, pp. 31-42.
Stanley, 2002, "Evolving Neural Networks Through Augmenting Topologies" (Year: 2002).
Cui et al, Oct. 2018, "Evolutionary Stochastic Gradient Descent for Optimization of Deep Neural Networks" (Year: 2018).
Jaimes & Coello, 2005, "MRMOGA: Parallel Evolutionary Multiobjective Optimization using Multiple Resolutions" (Year: 2005).
Cruz-Ramirez, 2010, "Memetic pareto differential evolutionary artificial neural networks to determine growth multi-classes in predictive microbiology" (Year: 2010).
Cruz-Ramirez et al, 2011, "Selecting the Best Artificial Neural Network Model from a Multi-Objective Differential Evolution Pareto Front" (Year: 2011).
Jin & Sendhoff, 2008, "Pareto-Based Multiobjective Machine Learning: An Overview and Case Studies" (Year: 2008).
Storsveen et al, 2008, "Evolving a 2D Model of an Eye using CPPNs" (Year: 2008).
Shi, 2008, "An Empirical Comparison of Evolution and Coevolution for Designing Artificial Neural Network Game Players" (Year: 2008).
Garciarena et al, Jul. 2018, "Evolved GANs for generating Pareto set approximations" (Year: 2018).
Miikkulainen et al, Mar. 3, 2017, "Evolving Deep Neural Networks" (Year: 2017).
Canadian Examination Report issued in App. No. CA3129731, dated Oct. 24, 2022, 4 pages.
U.S. Appl. No. 62/468,224, titled "Asynchronous Evaluation Strategy for Evolution of Deep Neural Networks," filed Mar. 7, 2017.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.
Unpublished Article, Modular Universal Reparameterization: Deep Multi-Task Learning Across Diverse Domains, 10 pp.
U.S. Appl. No. 13/184,307—Office Action dated Mar. 21, 2014, 38 pages.
U.S. Appl. No. 13/184,307—Response dated Jun. 23, 2014, 32: pages.
U.S. Appl. No. 13/358,381—Office Action dated Jul. 8, 2014, 30 pages.
U.S. Appl. No. 13/540,507—Office Action dated Sep. 9, 2014, 25 pages.
U.S. Appl. No. 13/540,507—Response filed Oct. 15, 2014, 20 pages.
U.S. Appl. No. 13/895,238—Office Action dated Jan. 2, 2014, 17 pages.
U.S. Appl. No. 13/943,630—Office Action dated May 27, 2015, 42 pages.
U.S. Appl. No. 13/943,630—Response to Office Action dated May 27, 2015 filed Sep. 23, 2015, 8 pages.
U.S. Appl. No. 13/945,630—Notice of Allowance dated Nov. 18, 2015, 8 pages.
U.S. Appl. No. 13/945,630—Office Action dated Mar. 12, 2015, 18 pages.
U.S. Appl. No. 13/945,630—Response to Final Office Action dated Aug. 4, 2015 filed Nov. 4, 2015, 12 pages.
U.S. Appl. No. 14/014,063—Office Action dated May 7, 2014, 19 pages.
U.S. Appl. No. 14/539,908—Response to Office Action dated Oct. 1, 2015 filed Feb. 1, 2016, 18 pages.
U.S. Appl. No. 14/595,991—Office Action dated May 10, 2017, 32 pages.
U.S. Appl. No. 15/794,905—Non Provisional Application filed Oct. 26, 2017, 60 pages.
U.S. Appl. No. 15/794,913—Non-Provisional Application filed Oct. 28, 2017, 73 pages.
Utech, J., et al., "An evolutionary algorithm for drawing directed graphs," Proc. of the Int. Conf. on Imaging Science, Systems and Technology, 8 pages, 1998.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wahlström, N., Schon, T. B., and Deisenroth, M. P., "From pixels to torques: Policy learning with deep dynamical models," arXiv preprint arXiv: 1502.02251, 2015. 9 pages.
Wang, Z., Schaul, T., Hessel, M., Van Hasselt, H., Lanctot, M., and De Freitas, "Dueling Network Architectures for Deep Reinforcement Learning, in Proceedings of the 33rd International Conference on Machine Learning (ICML) (ICML '16)," vol. 48, JMLR org., 1995-2003.
Whitehead, B. A,, "Genetic Evolution of Radial Basis .Function Coverage Using Orthogonal Niches," IEEE Transactions on Neural Networks, 7:6, Nov. 1996, 1525-28.
Wissner-Gross, et al., "Causal Entropic Forces," Physical Review Letters, PRL 110.168702, American Physical Society, Apr. 19, 2013, 5 pages.
Written Opinion from Singapore Patent Office in related application SG 201003127-6, dated Jun. 16, 2011, 9 pp.
Wu, A.S. et al., "An incremental fitness function for partitioning parallel taks," Proc. Genetic and Evolutionary Computation Conf. (Aug. 2001) 8pp.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv:1605.06391 (2016), 12 pages.
Yang Fan, et al., "Learning to Teach," ICLR 2018, arXiv: 1805.03643v1, May 9, 2018, 16 pp.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.
Zhang, et al., "Evolutionary Computation Meets Machine Learning: A Survey," IEEE Computational Intelligence Magazine, vol. 6, No. 4, DOI 10.1109/MCI.2011.942584, 2011.
Zhang, Loy, "Facial Landmark Detection by Deep Multi-Task Learning," in Proceedings of ECCV'14, 2014, 15 pages.
Zhiwei Zeng, et al., "Context-Based and Explainable Decision Making With Argumentation," http://ifaamas.org/Proceedings/aamas2018/opdfs/p1114.pdf, 2018. 9 pages.
Deychakiwsky Normalized Cross-Entropy—Deylemma, github.i io 2020 (Year: 2020).
Pan, L. et al., "A Classification-Based Surrogate-Assisted Evolutionary Algorithm for Expensive Many-objective Optimization", IEEE, https://ieeexplore.ieee.org/document/8281523, Feb. 1, 2019.
Robinet, V. et al., "Inducing High-Level Behaviors from Problem-Solving Traces Using Machine-Learning Tools", IEEE, https://ieeexplore.ieee.org/document/4287270, Aug. 13, 2007.
Canadian Examination Report issued in App. No. CA 3,131,688, dated Sep. 12, 2023, 4 pages.
Pan et al ("A Classification-Based Surrogate-Assisted Evolutionary Algorithm for Expensive Many-objective Optimization" Feb. 2019) (Year: 2019).
Santiago Gonzalez, et al., "Improved Training Speed, Accuracy, and Data Utilization Through Loss Function Optimization," Version 3, arXiv: 1905.11528v3, dated Apr. 27, 2020. 7 pages.
Schoreels, C., "Agent Based Genetic Algorithm Employing Financial Technical Analysis for Making Trading Decisions Using His-

(56) References Cited

OTHER PUBLICATIONS torical Equity Market Data," IEEE/WIC/ACM International Conference on Intelligent Agent Technology (IAT20Q4), Bering, China, Sep. 20-24, 2004, pp. 421-424.
Schulman, J., Wolski, F., Dhariwal, P., Radford, A., and Klimov, O., "Proximal Policy Optimization Algorithms," CoRR abs/1707.06347, 2017. 12 pages.
Scott, E. O., et al., "Understanding Simple Asynchronous Evolutionary Algorithms," Jan. 17-20, 2015, 15 pp.
Secretan, J., et al., "Picbreeder: A Case Study in Collaborative Evolutionary Exploration of Design Space," Evolutionary Computation journal, MIT Press, Copyright 2011, 30 pages.
Shahrzad, et al., "Tackling the Boolean Multiplexer Function Using a Highly Distributed Genetic Programming System," in Genetic Programming Theory and Practice XII, 7 pp., 2015.
Shazeer et al., "Outrageously large neural networks: The sparsely-gated mixiure-of-experts layer," arXiv preprint arXiv:1701.08538 (2017), 19 pages.
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley et al., Why greatness cannot be planned: the myth of the objective, Genet. Program Evolvable Mach.,m 16:559-561, 2015.
Stanley, et al., "Why Greatness Cannot Be Planned: The Myth of the Objective," New York, NY, Springer (2015). 2 pages.
Stanley, K. et al, "Designing neural networks through neuroevolution," Nature Machine Intelligence, vol. 1, p. 24-35 (Jan. 2019).
Stanley, Kenneth O., et al., "Real-Time Evolution of Neural Networks in the Nero Video Game," AAAI, vol. 6, 2006, 4 pp.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 pp., Retrieved from the Internet: http://www.ra.cs.uni-tuebingen.de/mitarb/streiche/publications/Introduction_to_E_volutionary_Algorithms.pdf., XP055038571.
Supplementary European Search Report dated Oct. 12, 2012 in EP 10770288, 12 pages.
Supplementary European Search Report dated Oct. 9, 2012 in EP 107702871, 11 pages.
Tanev, I., et al., "Scalable Architecture for Parallel Distributed Implementation of Genetic Programming on Network of Workstations," J. Systems Architecture, vol. 47, Jul. 2001, pp. 557-572.
Timothy Hospedales, et al., "Meta-Learning in Neural Networks: A Survey," arXiv: 2004.05439v1, Apr. 11, 2020, 23 pp.
Torresen, "A Dynamic Fitness Function Applied to Improve the Generalisation when Evolving a Signal Processing Hardware Architecture," Proc. EvoWorkshops 2002, 267-299 (12 pp).
U.S. Appl. No. 13/184,307—Notice of Allowance dated Aug. 4, 2014, 9 pages.
U.S. Appl. No. 13/184,307—Office Action dated Oct. 21, 2013, 16 pages.
U.S. Appl. No. 14/595,991—Final Office Action dated Feb. 27, 2018, 25 pages.
U.S. Appl. No. 14/595,991—Response to Final Office Action dated Feb. 27, 2018, filed May 22, 2018, 32 pages.
U.S. Appl. No. 14/595,991—Response to Final Office Action dated Feb. 27, 2018, filed Jul. 27, 2018, 41 pages.
U.S. Appl. No. 13/184,307—Response dated Jan. 22, 2014, 19 pages.
U.S. Appl. No. 13/358,381—Response dated Oct. 3, 2014, 21 pages.
U.S. Appl. No. 13/358,381—Amendment After Allowance filed Feb. 13, 2015, 20 pages.
U.S. Appl. No. 13/943,630—Amendment After Allowance dated Mar. 15, 2016, 16 pages.
U.S. Appl. No. 13/943,630—Notice of Allowance dated Jan. 21, 2016, 28 pages.
U.S. Appl. No. 13/943,630—Notice of Allowance dated May 19, 2016, 2 pages.
U.S. Appl. No. 13/945,630—Amendmend After Allowance dated Dec. 9, 2015, 7 pages.
U.S. Appl. No. 13/945,630—Final Office Action dated Aug. 4, 2015, 22 pages.
U.S. Appl. No. 13/945,630—Resonse to Office Action dated Mar. 12, 2015 filed Jul. 13, 2015, 9 pages.
U.S. Appl. No. 13/945,630—Response filed Nov. 4, 2015, 12 pp.
U.S. Appl. No. 14/539,908—Notice of Allowance dated Mar. 17, 2016, 15 pages.
U.S. Appl. No. 14/539,908—Office Action dated Oct. 1, 2015, 33 pages.
U.S. Appl. No. 14/539,908—Response filed Feb. 1, 2016, 18 pp.
U.S. Appl. No. 14/595,991—Office Action, dated Feb. 27, 2018, 19 pp.
U.S. Appl. No. 14/595,991—Response to Office Action dated May 10, 2017, filed Nov. 10, 2017, 29 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy for Evolution of Deep Neural Networks," filed Mar. 3, 2018.
Extended EPO Search Report, App. No. 19878418.3-1203/3942483 PCT/U.S. Pat. No. 2019061198, May 27, 2022.
Elsken Thomas et al., Efficient Multi-Objective Neural Architecture Search via Lamarckian Evolution, ICLR 2019, Feb. 26, 2019 (URL: https://arxiv.org/pdf/1804.09081.pdf).
Lu Zhichao et al., NSGA-NET neural architecture search using multi-objective genetic algorithm, Proceedings of the Genetic and Evolutionary Computation Conference, ACMPUB27, NY, NY, Jul. 13, 2019.
Yousefi, N., Georgiopoulos, M. and Anagnostopoulos, G.C., 2015. Multi-task learning with group-specific feature space sharing. In Machine Learning and Knowledge Discovery in Databases: European Conference, ECML PKDD 2015, Porto, Portugal, Sep. 7-11, 2015, Proceedings, Part II 15 (pp. 120-136). Springer International Publishing.

* cited by examiner

Cognizant — Prescribing channel's marketing spend using LEAF

Define Context
Select Geography: California
Select Specialty Group: PCP
Total Budget: $1,711,176
>> Evaluate Prescriptions
Select Month: March Evaluate Prescription   Generate Scenarios   View Comparisons Edit Channel Spends to generate Scenarios

| Promotion Channel | Prescribed Budget | Prescribed Budget Percentage | Scenario Budget Percentage |
|---|---|---|---|
| Co-Pay | $2,980 | 14.8% | 14.8% |
| Detailing | $17,088 | 84.5% | 84.5% |
| Direct Mail | $139 | 0.7% | 0.7% |
| Medscape | $0 | 0.0% | 0.0% |
| Speaker Program | $0 | 0.0% | 0.0% |
| Total | | | 100.0% |

Evaluate    Reset

Cognizant

Human Resources Analytics Prescription Simulator

ESP Suggested Prescription

Description Input (Context Scenario) — 312

| org_tenure | rehire | hire_source | tenure_present_level | niche_skill_resource | experience | total_experience |
|---|---|---|---|---|---|---|
| 5 to 10 ▽ | no ▽ | CAMPUS ▽ | >+75 ▽ | no ▽ | 10 to 15 ▽ | 200 to 300 |

[Upload File] [Reset]

Prescribe Actions

Actions Prescribed — 314B

| account_change | appraisal_rate | bench_time | certifications | reportee | performance_improvement_tag | project_location | last_onsite_duration | skill_proficiency | reward_recognized | de... |
|---|---|---|---|---|---|---|---|---|---|---|
| yes | One | +0.8 | No | 0 to 4 | No | COMPANY | 25 to 50 | Medium | yes | Lo... |

Estimated Outcome

[Click to measure effect of action override]

Outcome — 316B

Probability of Attrition
Probability of NO 90.5%

| NPI name | Level 0 | Level 1 | Level 2 | Level 3 | Level 4 |
|---|---|---|---|---|---|
| C1_School closing | no measures | recommend closing | require closing (only some levels or categories, e.g. just high school, or just public schools) | require closing all levels | |
| C2_Workplace closing | no measures | recommend closing (or recommend work from home) | require closing (or work from home) for some sectors or categories of workers | require closing (or work from home) for all-but-essential workplaces (e.g. grocery stores, doctors) | |
| C3_Cancel public events | no measures | recommend cancelling | require cancelling | | |
| C4_Restrictions on gatherings | no restrictions | restrictions on very large gatherings (the limit is above 1000 people) | restrictions on gatherings between 101-1000 people | restrictions on gatherings between 11-100 people | restrictions on gatherings of 10 people or less |
| C5_Close public transport | no measures | recommend closing (or significantly reduce volume/ route/means of transport available) | require closing (or prohibit most citizens from using it) | | |
| C6_Stay at home requirements | no measures | recommend not leaving house | require not leaving house with exceptions for daily exercise, grocery shopping, and "essential" trips | require not leaving house with minimal exceptions (e.g. allowed to leave once a week, or only one person can leave at a time, etc.) | |
| C7_Restrictions on internal movement | no measures | recommend not to travel between regions/cities | internal movement restrictions in place | | |
| C8_International travel controls | no restrictions | screening arrivals | quarantine arrivals from some or all regions | ban arrivals from some regions | ban on all regions or total border closure |

FIGURE 6a

FRAMEWORK FOR INTERACTIVE EXPLORATION, EVALUATION, AND IMPROVEMENT OF AI-GENERATED SOLUTIONS

CROSS REFERENCE TO RELATED APPLICATIONS

This application claims benefit of priority to U.S. Provisional Patent Application No. 63/006,434 entitled FRAMEWORK FOR INTERACTIVE EXPLORATION, EVALUATION, AND IMPROVEMENT OF AI-GENERATED SOLUTIONS, filed Apr. 7, 2020 which is incorporated herein by reference in its entirety.

This application cross-references and incorporates by reference herein in their entireties: U.S. application Ser. No. 17/064,706 entitled METHOD AND SYSTEM FOR SHARING META-LEARNING METHOD(S) AMONG MULTIPLE PRIVATE DATA SETS which was filed on Oct. 7, 2020; U.S. application Ser. No. 16/902,013 entitled PROCESS AND SYSTEM INCLUDING EXPLAINABLE PRESCRIPTIONS THROUGH SURROGATE-ASSISTED EVOLUTION which was filed on Jun. 15, 2020; U.S. application Ser. No. 16/831,550 entitled OPTIMIZATION ENGINE WITH EVOLUTIONARY SURROGATE-ASSISTED PRESCRIPTIONS which was filed on Mar. 26, 2020 and U.S. application Ser. No. 16/424,686 entitled SYSTEMS AND METHODS FOR PROVIDING SECURE EVOLUTION AS A SERVICE which was filed on May 29, 2019.

Additionally, the following applications and publications are also incorporated herein by reference: Miikkulainen et al., From Prediction to Prescription: Evolutionary Optimization of Non-Pharmaceutical Interventions in the COVID-19 Pandemic, IEEE TRANSACTIONS ON EVOLUTIONARY COMPUTATION, VOL. NO. 2021; Johnson, A. J., et al., Flavor-cyber-agriculture: Optimization of plant metabolites in an open-source control environment through surrogate modeling. PLOS ONE, 2019; U.S. Provisional Patent Application No. 63/049,370 entitled "AI Based Optimized Decision Making For Epidemiological Modeling" filed Jul. 8, 2020; Miikkulainen, R., et al., Ascend by evolv: AI-based massively multivariate conversion rate optimization. AI Magazine, 42:44-60, 2020. The applications and publications list overlapping inventors and provide additional description and support for one or more of the embodiments herein.

Further, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

FIELD OF THE TECHNOLOGY

The disclosed embodiments relate, generally, to a user-driven exploration system and process, referred to herein as a scratchpad, as a post-learning extension for machine learning systems. More particularly, an interface provides functionality to support modifications to AI-generated solutions, and comparisons of expected performance for such modified solutions across AI and/or human-generated solutions.

DESCRIPTION OF THE RELATED ART

Many organizations in business, government, education, and health-care now collect significant data about their operations. Such data is transforming decision making in organizations: It is now possible to use machine learning techniques to build predictive models of, for example, industrial processes, political processes, drug discovery, behaviors of customers, consumers, students, and competitors, and, in principle, make better decisions, i.e. those that lead to more desirable outcomes. However, while prediction is necessary, it is only part of the process. Predictive models do not specify what the optimal decisions actually are. To find a good decision strategy (also referenced herein as a solution), different approaches are needed.

The main challenge is that optimal strategies are not known, so standard gradient-based machine learning approaches cannot be used. The domains are only partially observable, and decision variables and outcomes often interact nonlinearly. For instance, allocating marketing resources to multiple channels may have a nonlinear cumulative effect, or nutrition and exercise may interact to leverage or undermine the effect of medication in treating an illness. Such interactions make it difficult to utilize linear programming and other traditional optimization approaches from operations research. A discussion regarding the deficiencies of the prior art process can be found in Creative AI Through Evolutionary Computation by Risto Miikkulainen arXiv: 1901.03775v2 (22 Feb. 2020) the contents of which is incorporated herein by reference.

Instead, good decision strategies need to be found using search, i.e., by generating strategies, evaluating them, and generating new, hopefully better strategies based on the outcomes. In many domains such search cannot be done in the domain itself. For instance, testing an ineffective marketing strategy or medical treatment could be prohibitively costly. However, given that historical data about past decisions and their outcomes exist, it is possible to do the search using a predictive model as a surrogate to evaluate them. Once good decision strategies have been found using the surrogate, they are tested in the real world.

Even with the surrogate, the problem of finding effective decision strategies is still challenging. Nonlinear interactions may result in deceptive search landscapes, where progress towards good solutions cannot be made through incremental improvement and thus discovering them requires large, simultaneous changes to multiple variables. Decision strategies often require balancing multiple objectives, such as performance and cost, and in practice, generating a number of different trade-offs between them is needed. Consequently, search methods such as reinforcement learning (RL), where a solution is gradually improved through local exploration, do not lend themselves well to searching solution strategies either. Further, the number of variables can be very large, e.g. thousands or even millions as in some manufacturing and logistics problems, making methods such as Kriging and Bayesian optimization ineffective. Moreover, the solution is not a single point but a strategy, i.e. a function that maps input situations to optimal decisions, exacerbating the scale-up problem further.

In co-owned U.S. application Ser. No. 16/831,550, Evolutionary Surrogate-Assisted Prescription ("ESP") is introduced. Evolutionary Surrogate-assisted Prescription (ESP)

is a machine learning technology that makes it possible to come up with good decision strategies automatically. The idea is to use historical data to build a predictive surrogate model, and population based search (i.e. evolutionary computation) to discover good decision strategies. Each strategy is evaluated with the surrogate instead of the real world, so that millions of strategies can be tested before they are deployed in the real world (where mistakes may be costly).

In ESP, the surrogate ("Predictor") is a machine learning algorithm, such as but not limited to, a rule set, random forest or a neural network trained with gradient descent, and the strategy ("Prescriptor") is a neural network or rule set that is evolved to maximize the predictions of the surrogate model. In special cases, the Predictor could be a simulator or even the real-world. ESP can be extended to sequential decision-making tasks, which makes it possible to evaluate the framework in reinforcement learning (RL) benchmarks. Because the majority of evaluations are done on the surrogate, ESP is more sample efficient, has lower variance, and lower regret than standard RL approaches. ESP solutions are also better because both the surrogate and the strategy network regularize the decision making behavior. ESP thus introduces a foundation to decision optimization in real-world problems. The applicability of ESP to address problems in real-world domains is limitless.

When a solution is generated by an artificial intelligence (AI) system, or more generally a computational/automatic/algorithmic system such as ESP, it is presented to the user as the best solution found, often with an estimate of how well the system expects the solution to perform. In some cases, the system may generate a number of solutions, possibly representing tradeoffs between performance objectives, from which the user can choose one or more to be deployed.

In many of these cases, the user has considerable experience in the domain, and may be skeptical about an AI-generated outcome. The user's experience might also be used to modify the AI-generated solutions, and possibly create better ones. Current AI systems do not provide functionality to support such post-AI modifications, nor do they provide estimates of expected performance for such user-modified solutions that could be compared across AI and/or human-generated solutions. Accordingly, there is a need in the art for a mechanism to assist users in selecting an AI-generated solutions for deployment.

SUMMARY OF EMBODIMENTS

In a first embodiment, a computer-implemented process for evolving an optimized prescriptor model for determining optimal decision policy outcomes related to an identified problem includes: building a predictor surrogate model based on historical training data to predict an outcome; feeding the predictor surrogate model into an evolutionary algorithm framework to evolve a prescriptor model over multiple generations, wherein subsequent generations are evolved based on results of prior generations until at least one optimized prescriptor model is determined, the optimized prescriptor model including optimal actions (A); providing the optimal prescriptor actions (A) identified by the at least one optimized prescriptor model to the predictor surrogate model to generate an optimal outcome result (O) based thereon; displaying the optimal prescriptor actions (A) with the optimal outcome result (O) to a user; providing at least one first selection component to the user to modify at least one value for one or more of the optimal prescriptor actions (A) to generate a modified prescriptor model and one or more modified actions ($A'''$); providing the one or more modified actions ($A'''$) to the predictor surrogate model to generate a modified outcome result ($O'''$); and displaying at least the modified outcome result ($O'''$) to the user.

In a second embodiment, at least one computer-readable medium storing instructions that, when executed by a computer, perform a method for evolving an optimized prescriptor model for determining optimal decision policy outcomes related to an identified problem, the method includes: building a predictor surrogate model based on historical training data to predict an outcome; feeding the predictor surrogate model into an evolutionary algorithm framework to evolve a prescriptor model over multiple generations, wherein subsequent generations are evolved based on results of prior generations until at least one optimized prescriptor model is determined, the optimized prescriptor model including optimal actions (A); providing the optimal prescriptor actions (A) identified by the at least one optimized prescriptor model to the predictor surrogate model to generate an optimal outcome result (O) based thereon; displaying the optimal prescriptor actions (A) with the optimal outcome result (O) to a user; providing at least one first selection component to the user to modify at least one value for one or more of the optimal prescriptor actions (A) to generate a modified prescriptor model and one or more modified actions ($A'''$); providing the one or more modified actions ($A'''$) to the predictor surrogate model to generate a modified outcome result ($O'''$); and displaying at least the modified outcome result ($O'''$) to the user.

In a third embodiment, a computer-implemented process for evolving an optimized prescriptor model for determining optimal decision policy outcomes related to an identified problem having at least two objectives includes: building a predictor surrogate model based on historical training data to predict an outcome, wherein the historical training data includes both context training data and action training data related to the identified problem; evolving a prescriptor model within an evolutionary framework including the predictor surrogate model, wherein the prescriptor model is a decision policy which prescribes actions in a context to achieve an outcome, and further wherein evolving the prescriptor model includes evolving the prescriptor model over multiple generations using the predictor model to determine an outcome for each prescriptor model until at least one optimized prescriptor model is identified; generating an optimal outcome result (O) to the identified problem based on the optimized prescriptor model, wherein the at least one optimal outcome result (O) balances the at least two objectives; displaying the at least one optimal outcome result (O) to the identified problem to a user, along with optimal actions (A) corresponding to the at least one optimal outcome result and the balances of the at least two objectives; providing at least one first selection component to the user to modify at least one value for one or more of the optimal actions (A) to generate one or more modified actions ($A'''$); providing a second selection component to the user to vary a percentage balance between the at least two objectives; providing selected modified actions ($A'''$) and selected percentage balance between the at least two objectives to the predictor surrogate model to generate at least one modified outcome result ($O'''$); and displaying at least the modified outcome result ($O'''$) to the user.

BRIEF DESCRIPTION OF FIGURES

The invention will be described with respect to specific embodiments thereof, and reference will be made to the drawings, in which:

FIGS. 3a, 3b and 3c illustrate a second exemplary application of the embodiment described herein to the problem of allocating marketing channel spend;

FIGS. 5a-5c illustrate a fourth exemplary application of the embodiment described herein to the problem of employee retention;

FIGS. 6a-6j illustrate a fifth exemplary application of the embodiment described herein to the problem of determining optimal non-pharmaceutical interventions ("NPIs") for addressing the COVID-19 pandemic;

DESCRIPTION OF EMBODIMENTS

Generally, the embodiments described herein provide a user-driven exploration functionality, referred to herein as a Scratchpad, which is as a post-learning extension for machine learning systems. For example, in ESP, consisting of the Predictor (a surrogate model of the domain) and Prescriptor (a solution generator model), the Scratchpad allows the user to modify the suggestions of the Prescriptor, and evaluate each such modification interactively with the Predictor. Thus, the Scratchpad makes it possible for the human expert and the AI to work together in designing better solutions. This interactive exploration also allows the user to conclude that the solutions derived in this process are the best found, making the process trustworthy and transparent to the user.

The implementation is described below within the context of the ESP framework described in detail in co-owned U.S. application Ser. No. 16/831,550, although it could be used with other Machine Learning (ML) systems that include a surrogate model (or sometimes called a world model) and a discovery mechanism of solutions (i.e. evolution, RL, linear or nonlinear programming). The co-owned applications incorporated herein by reference, as well as certain Figures described herein refer to ESP and other functionality as being part of the LEAF platform. LEAF stands for Learning Evolutionary Algorithm Framework and refers generally to a framework which incorporates the use of advanced evolutionary algorithms and deep learning to produce actionable results from complicated, multivariate problems.

Figure 1:
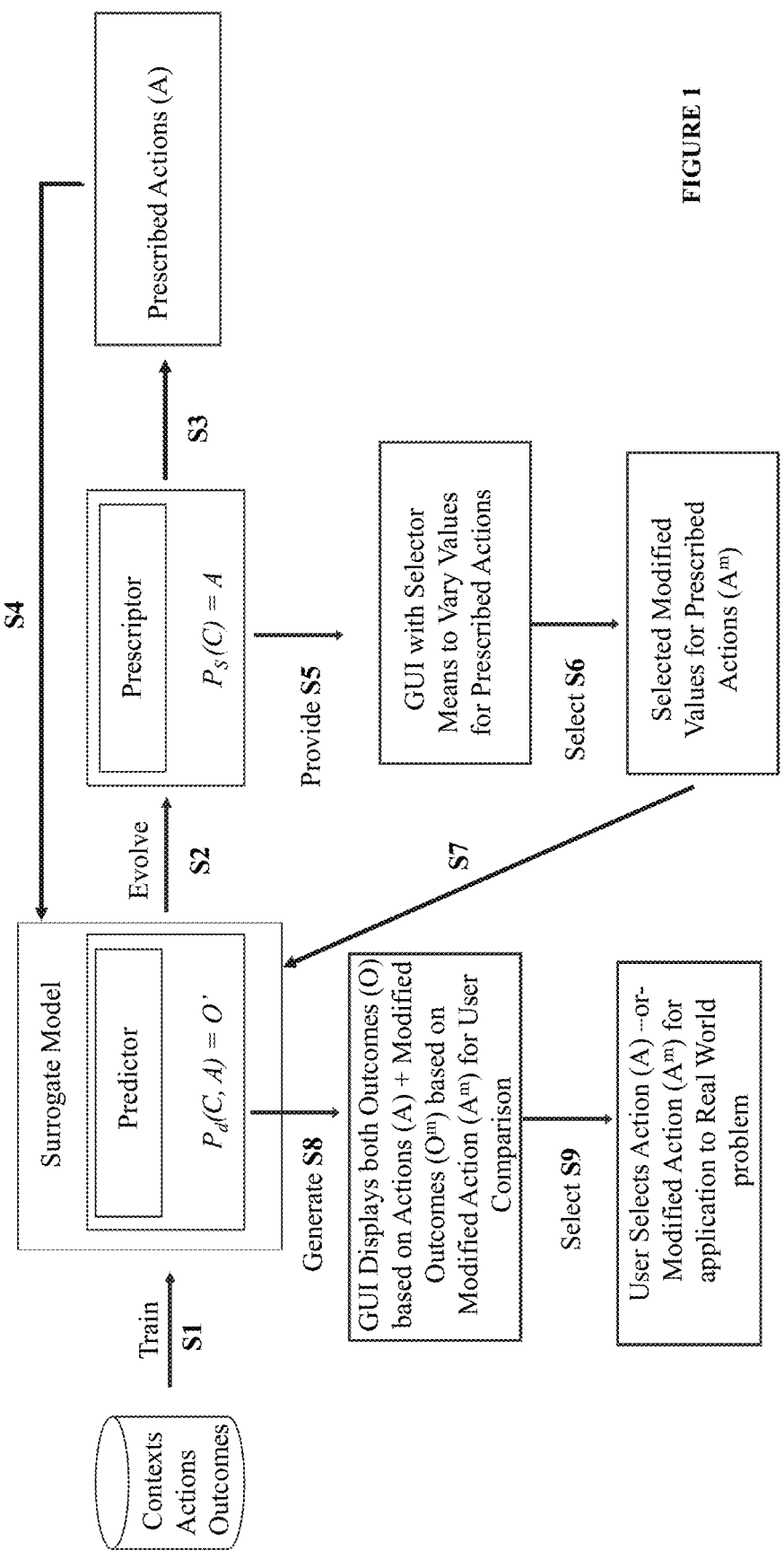
FIG. 1 illustrates a process flow in accordance with an embodiment herein.

Referring to FIG. 1, the ESP approach consists of two components: a prediction model (or the Predictor ($P_d$)) estimates how good the outcomes are for given actions in a given context, and a prescription model (the Prescriptor ($P_s$)) evolves decision strategies with corresponding actions for a given context that lead to optimal outcomes. The Predictor is trained using standard statistical machine learning techniques based on historical data on contexts, actions, and outcomes S1. Because the optimal actions are not known, the Prescriptor is developed using evolutionary computation to optimize actions, i.e. for each context to generate actions that lead to optimal outcomes S2. After evolution, the Prescriptor that performs the best is implemented as the decision making strategy—or in the case of multiple objectives, a set of Prescriptors that represent tradeoffs between the objectives and having prescribed actions (A) S3. The prescribed actions (A) from the evolved decision strategies are returned to the Predictor S4 to generate outcomes (O) (see S8 below). For any future problems (i.e. contexts (C)), the Prescriptor is consulted to find out what actions are expected to perform the best, and the Predictor is consulted to find out the expected outcomes.

At this point, the scratchpad functionality can be invoked. It takes the context representation and the action (A) recommendation generated by the Prescriptor as input and provides a graphical user interface (GUI) that allows the user to modify the Prescriptor's recommendations S5. The user makes selections using a selector means (e.g., drop down list, sliding button, up/down arrows, etc.) S6. And the selected modified recommendation ($A^m$) is then given to the Predictor (together with the context) as the input S7. The expected outcomes from the user's modified recommendation ($O^m$) are then displayed to the user along with the outcomes (O) from prescribed actions (A) S8. The Scratchpad GUI facilitates a visual comparison and the user can select Action (A) or modified Action ($A^m$) S9. In this manner, the user can use their expertise to explore changes to the recommendations generated by the ESP, and either find better solutions, or convince themselves that they do not exist, thus increasing confidence in the ESP-generated results.

Figure 2A:
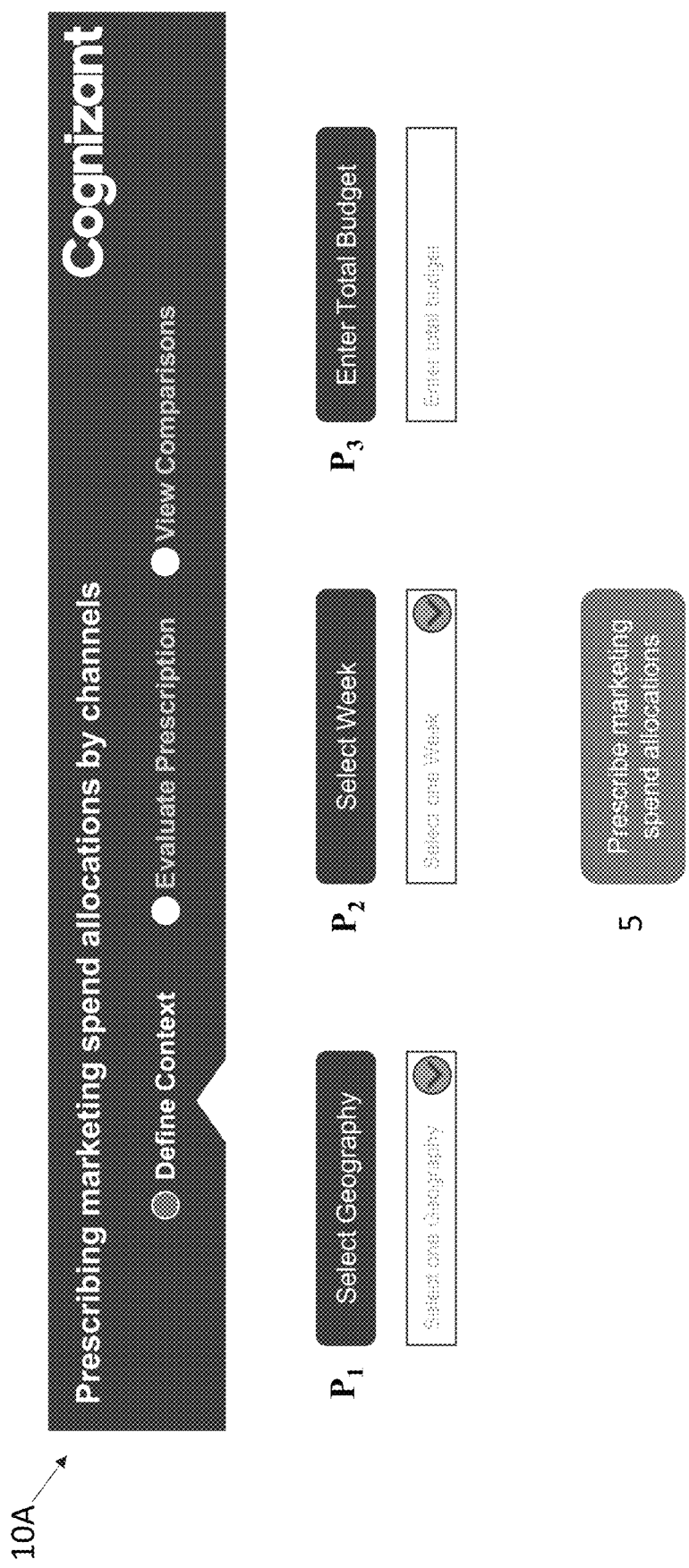
FIGS. 2a, 2b and 2c illustrate a first exemplary application of the embodiment described herein to the problem of allocating marketing channel spend.
Figure 2B:
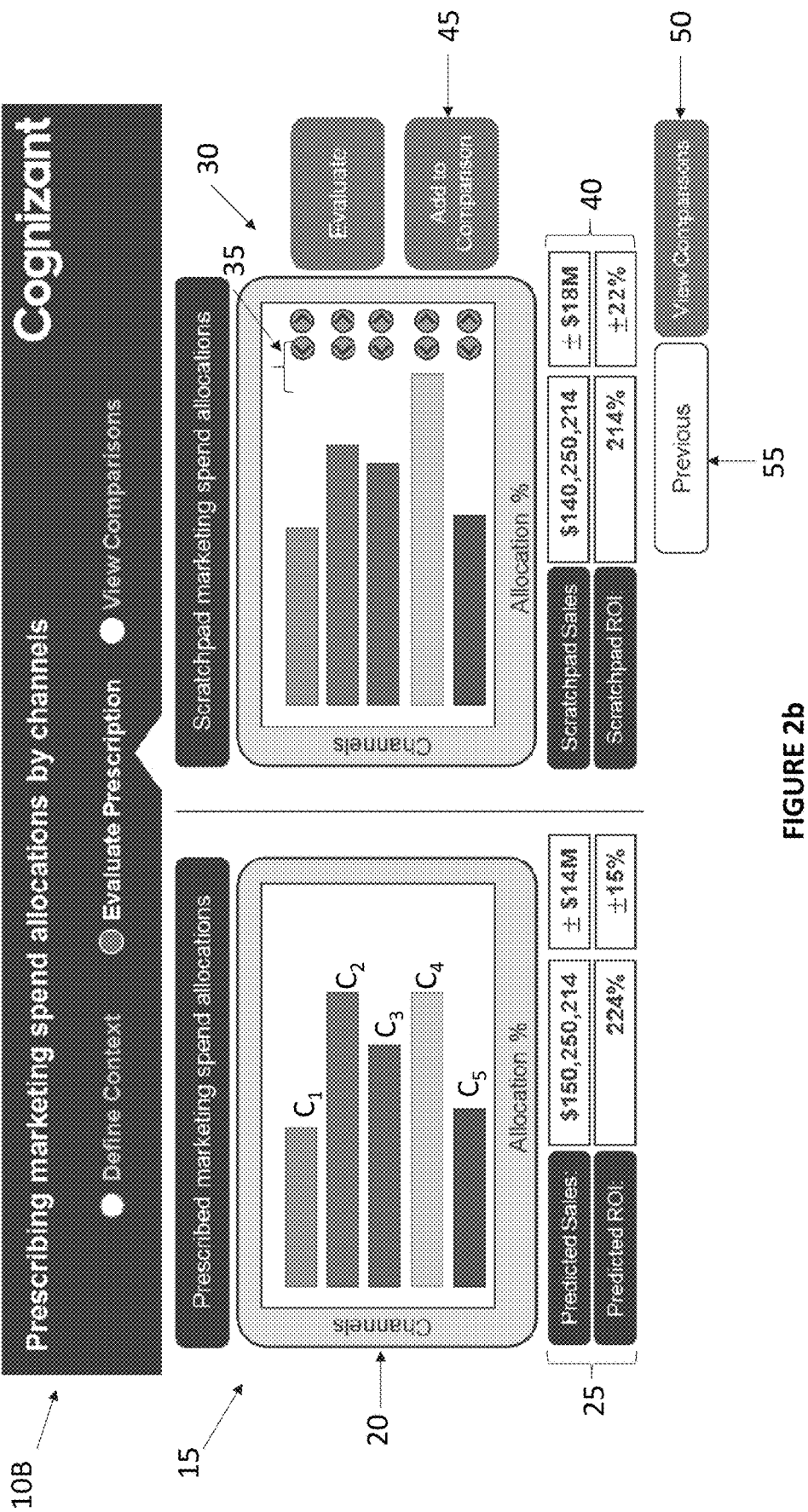
Figure 2C:
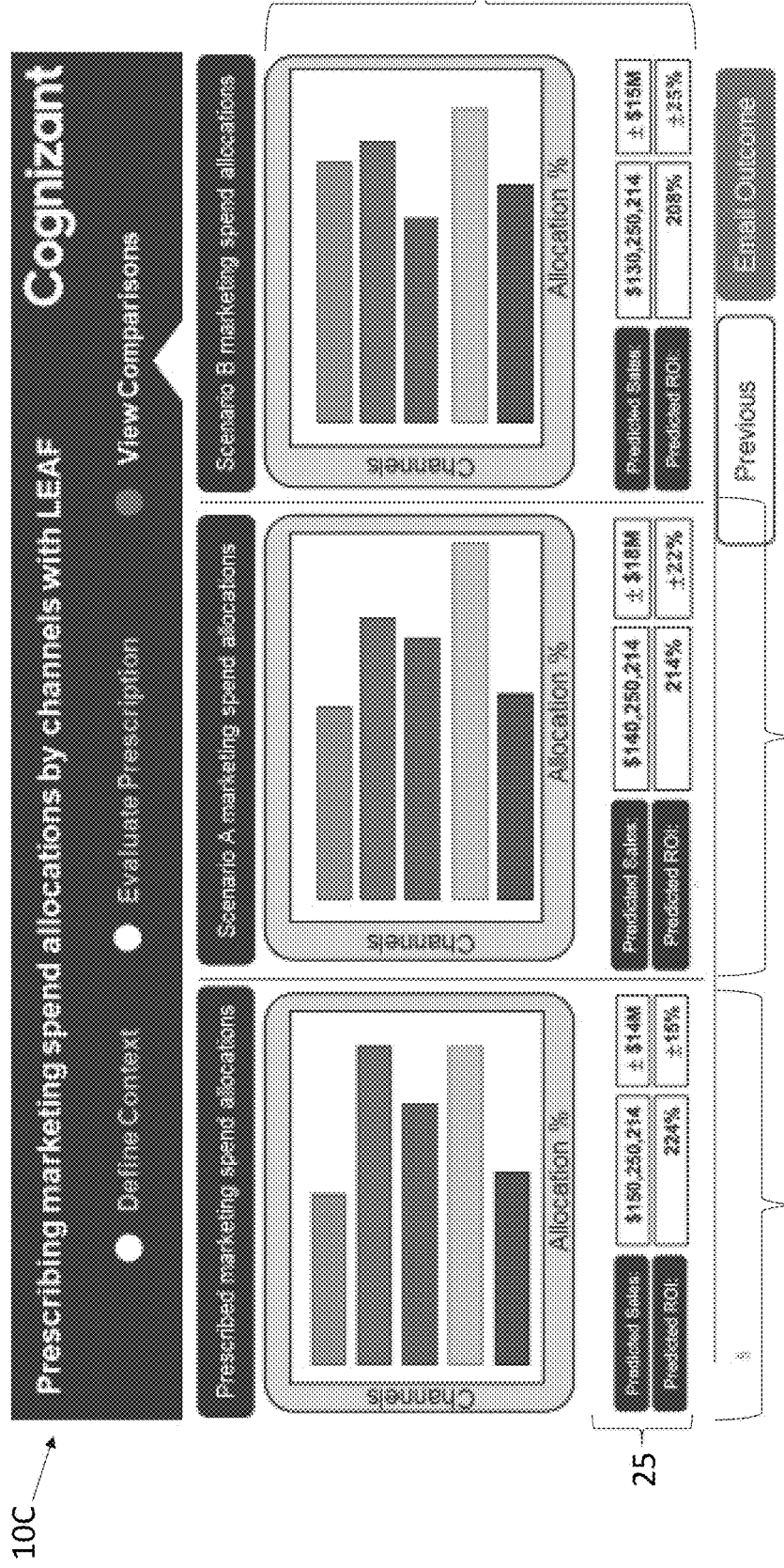

For instance, in a first exemplary embodiment FIG. 2a-2c, a series of screen shots exemplify a Scratchpad GUI for facilitating a user's exploration of AI proposed solutions generated by the ESP process and system of FIG. 1, to the problem of allocating resources to different marketing channels. In FIG. 2a, screen 10A provides the user with parameters for defining the context (C) within which they wish to investigate proposed solutions to the problem. The parameters shown, e.g., geography $P_1$, time period $P_2$ and total budget $P_3$, are relevant to the particular problem, i.e., resource allocation among marketing channels. One skilled in the art recognizes that there are myriad of different choices which could be used to define context depending on the particular problem for which a solution is sought. These are merely exemplary.

Once context is defined using screen 10A, the ESP process is initiated by the user via selection (or clicking) of the identified button 5. The proposed results from the ESP process are shown on screen 10B. The allocation percentages (i.e., Actions (A)) suggested by the Prescriptor are shown as a bar graph 20 in the left panel 15 including different marketing channels $C_1$, $C_2$, $C_3$, $C_4$, $C_5$. The expected performance (i.e., Outcomes) in Predicted Sales and Predicted ROI (Return on Investment) are shown below at 25. (In further embodiments described herein, multiple such solutions could be presented, each representing a different tradeoff between objectives.) On the right is the Scratchpad 30, which shows the same solution with increment/decrement arrows/selectors 35 that allow the user to adjust each channel allocation percentage individually to facilitate a user's exploration or testing of the AI-proposed solutions generated by the ESP process and system of FIG. 1. As the user makes these modifications, they are input to the ESP Predictor (FIG. 1), and the resulting expected Sales and ROI are shown immediately below as Scratchpad Sales and Scratchpad ROI 40. The user has the option of saving each such modified design into a set of Comparisons via the Add to Comparison feature 45, from which the user can later choose one or more to be deployed. Other features of the exemplified GUI and underlying functionality include the ability to View Comparisons 50 and a Previous 55.

Referring to FIG. 2c, clicking the View Comparisons selector from the screenshot in FIG. 2b, provides the user with a GUI visual 10C to compare prescribed marketing allocation spend 15 with proposed allocations calculated based on use of the Scratchpad 30 to toggle individual channel allocations. These proposed allocations are identified as Scenario A, 17 and Scenario B, 19 and below each graph is shown predicted sales and ROI 25 based on the allocation, including estimated variability as +/−.

Figure 3B:
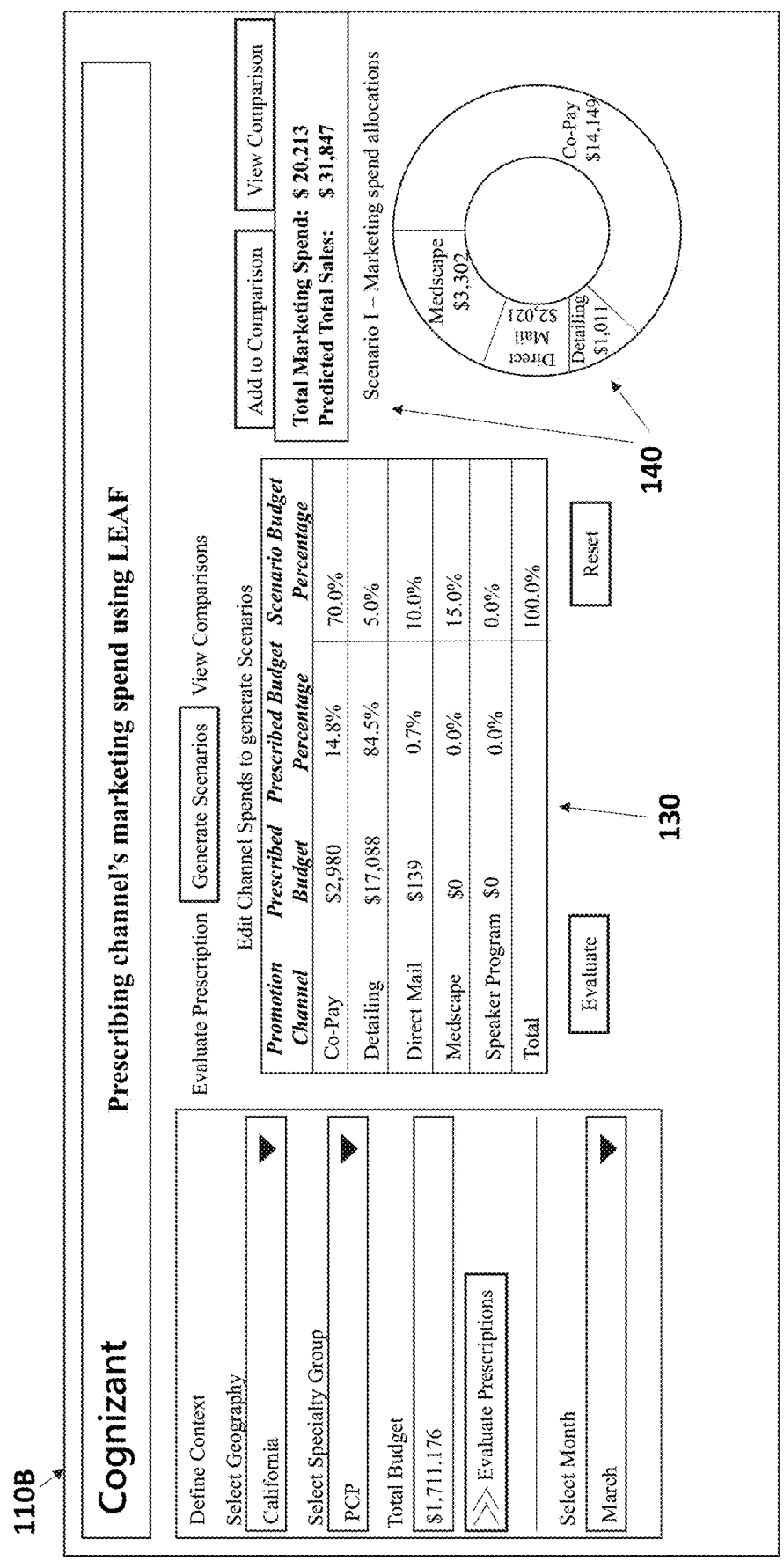
Figure 3C:
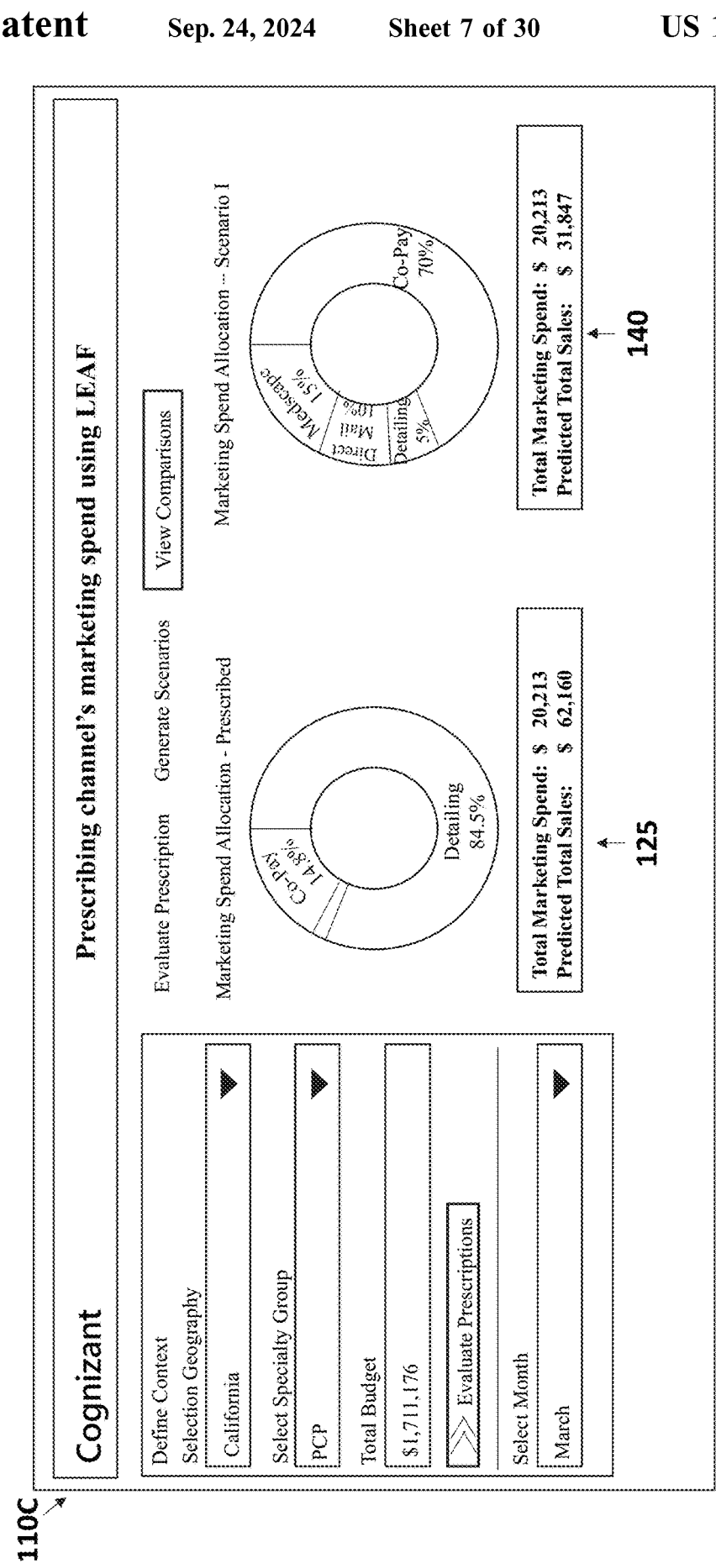

FIGS. 3a-3c illustrate an alternative set of exemplary screen shots for implementing the scratchpad process described herein. Like FIGS. 2a-2c, the screen shots in FIGS. 3a-3c facilitate a user's exploration of AI proposed solutions generated by the ESP process and system of FIG. 1, to the problem of allocating resources to different marketing channels. In FIG. 3a, screen 110A provides the user with parameters choices for defining the context (C) within which they wish to investigate proposed solutions to the problem. The parameters shown, e.g., geography $P_1$, specialty group $P_2$ and total budget $P_3$, are relevant to the particular problem, i.e., resource allocation among marketing channels for a particular industry, e.g., health care. While PCP, preferred care provider, is selected in this example, one skilled in the relevant art will appreciate the other possible choices for the specialty group parameter $P_2$. The present example also provides for an additional parameter, time period $P_4$. One skilled in the art recognizes that there are myriad of different choices which could be used to define context depending on the particular problem for which a solution is sought. These are merely exemplary.

Screen 110A, also shows the result generated by the ESP process. The proposed results from the ESP process are shown in 115. The allocation amounts or Actions (A), i.e., Prescribed Budget, and percentages of total budget, i.e., Prescribed Budget Percentage, suggested by the Prescriptor are shown in accordance with different promotion channels: Co-Pay $C_1$, Detailing $C_2$, Direct Mail $C_3$, Medscape $C_4$, Speaker Program $C_5$. Using the column of 115 labeled Scenario Budget Percentage, the scratchpad process may be initiated, wherein a user can alter one or more of the Actions and compare Outcomes with those of the Prescriptor-generated Actions.

In FIG. 3b, an exemplary Scenario I is shown on screen 110B, wherein certain channel budget percentages have been edited. These edited percentages, Actions (A), along with defined context (C) are input to the Predictor component of the ESP process to generate expected outcome (O), i.e., Total Marketing Spend and Predicted Total Sales for Scenario I. A user can compare the outcomes for Scenario I with the outcomes resulting from the AI-generated actions by selecting to View Comparison. The comparison results for this particular embodiment are shown on screen 110C in FIG. 3c. In this particular embodiment, the AI-generated actions are predicted to generate nearly double the sales compared to that of Scenario I actions.

FIGS. 4a-4k provide detailed examples of the ESP process and system, including post-AI Scratchpad functionality enabled and presented to users, as applied to the product pricing optimization domain (problem). In this embodiment, a user is able to maximize dual objectives, i.e., revenue and/or margin, using what-if simulation capabilities for pricing determination. In this example, the pricing is tied to products via SKU.

Figure 4A:
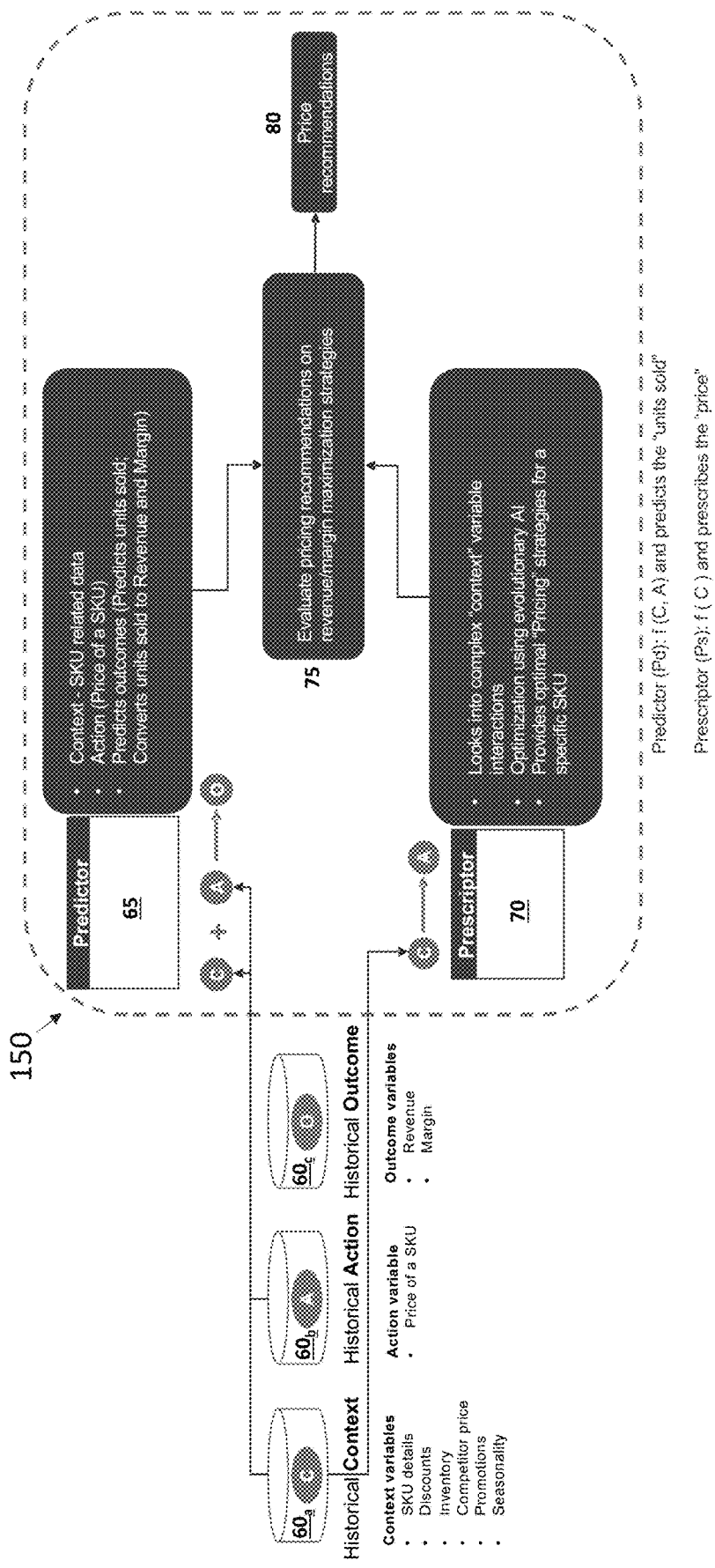
FIGS. 4a-4h illustrate a third exemplary application of the embodiment described herein to the problem of product price optimization.

FIG. 4a outlines the ESP system and process 100 of FIG. 1 as applied to a dual objective pricing optimization problem. The relevant domain data for historical context (C), historical action (A) and historical outcome (O) are stored in one or more databases $60_a$, $60_b$ and $60_c$ as needed. By way of example, domain data for historical context (C) includes some combination of context variables, e.g., SKU details, discounts, inventory, competitor price, promotions and seasonality; domain data for historical action (A) includes price of a SKU action variable; and domain data for historical outcome (O) includes revenue and margin outcome variables.

The context variables from $60_a$ and action variables from $60_b$ are input to train the Predictor model 65 which predicts outcomes, i.e., number of units sold, and converts to revenue and margin. By way of example, the Predictor model 65 could be an autoregressive integrated moving average (ARIMA) time series model. The trained Predictor 65 is used to evaluate 75 the actions, i.e., pricing recommendations on revenue and/or margin maximization strategies (identified generally as 75 in FIG. 3a) from the evolved Prescriptor 70. The output from evaluation 75 is the final pricing recommendations 80 per SKU.

Figure 4B:
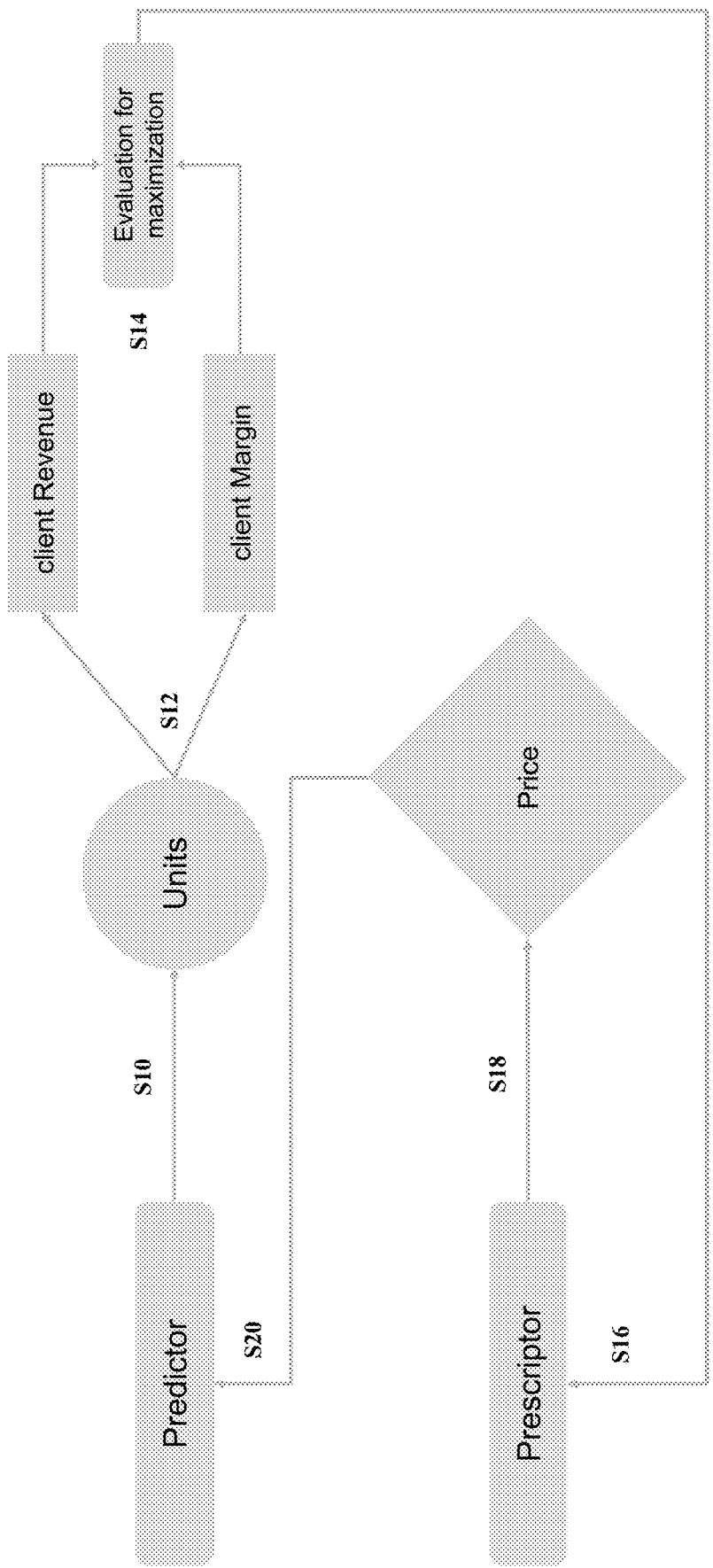

FIG. 4b represents an exemplary high level information flow during the ESP process as applied to the dual objective pricing optimization problem. The number of units sold is predicted by the Predictor using historical context (C) and actions (A) data S10, and is converted to client revenue and client margin data S12 and evaluated for maximization S14. The maximization data is input to the Prescriptor S16 which generates a Pareto front of possible pricing strategies for a specific SKU, from which a final price is selected based on predetermined criteria S18. This price, i.e., Action (A), becomes a part of the historical action data for use by the Predictor S20.

Figure 4C:
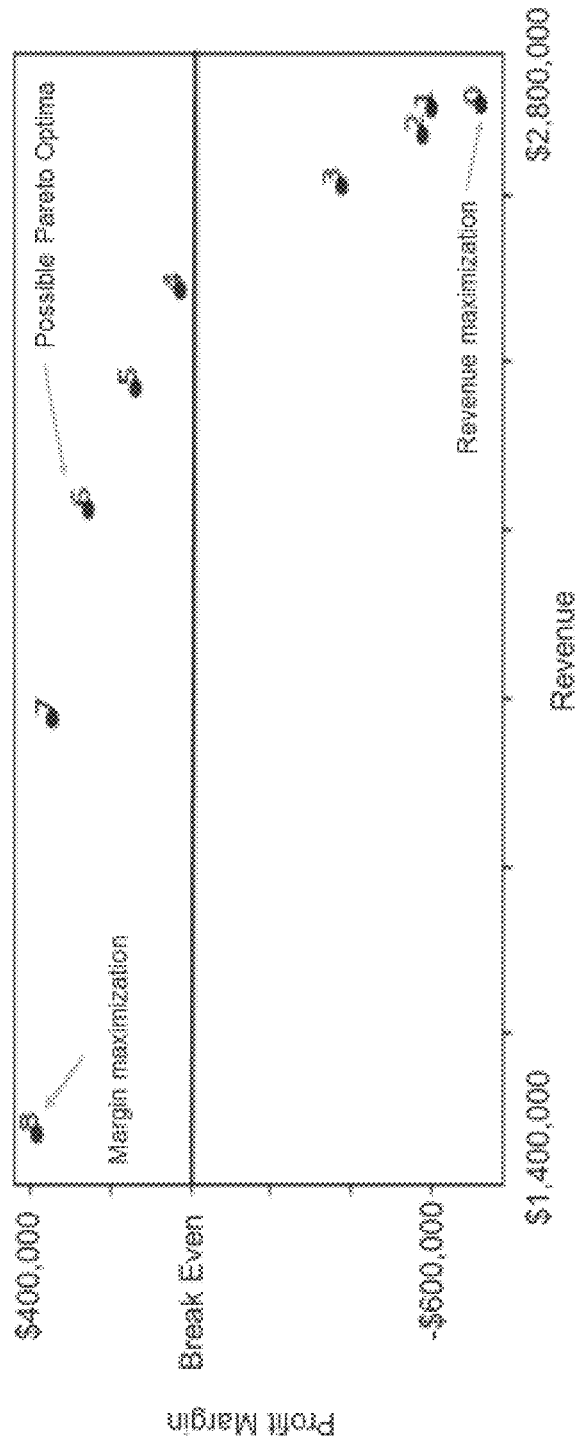

FIG. 4c is an exemplary graph showing a Prescriptor generated Pareto front for the current exemplary domain balancing the objectives of profit margin and revenue. One of numerous possible pareto optimal solutions is identified.

Figure 4D:
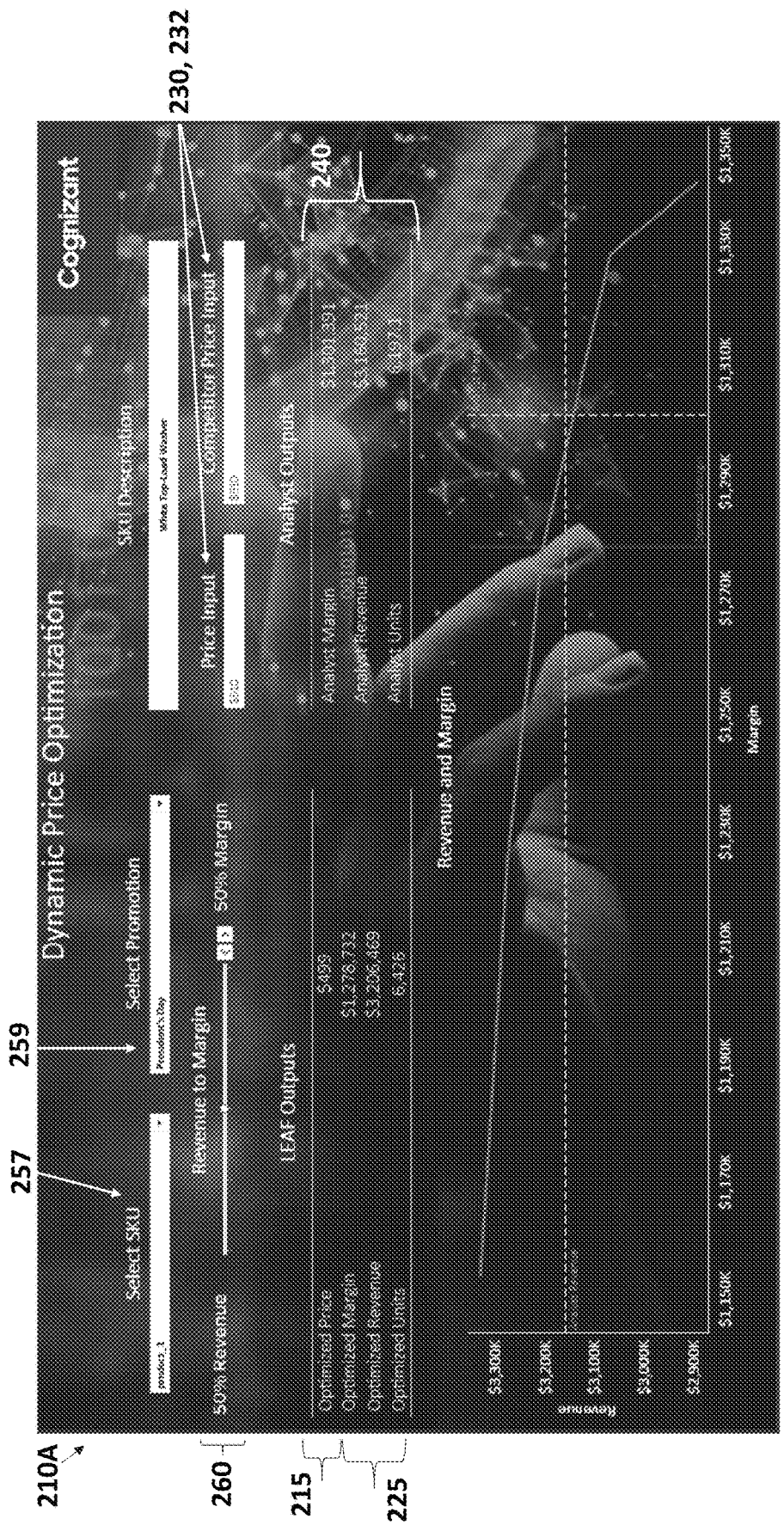
Figure 4E:
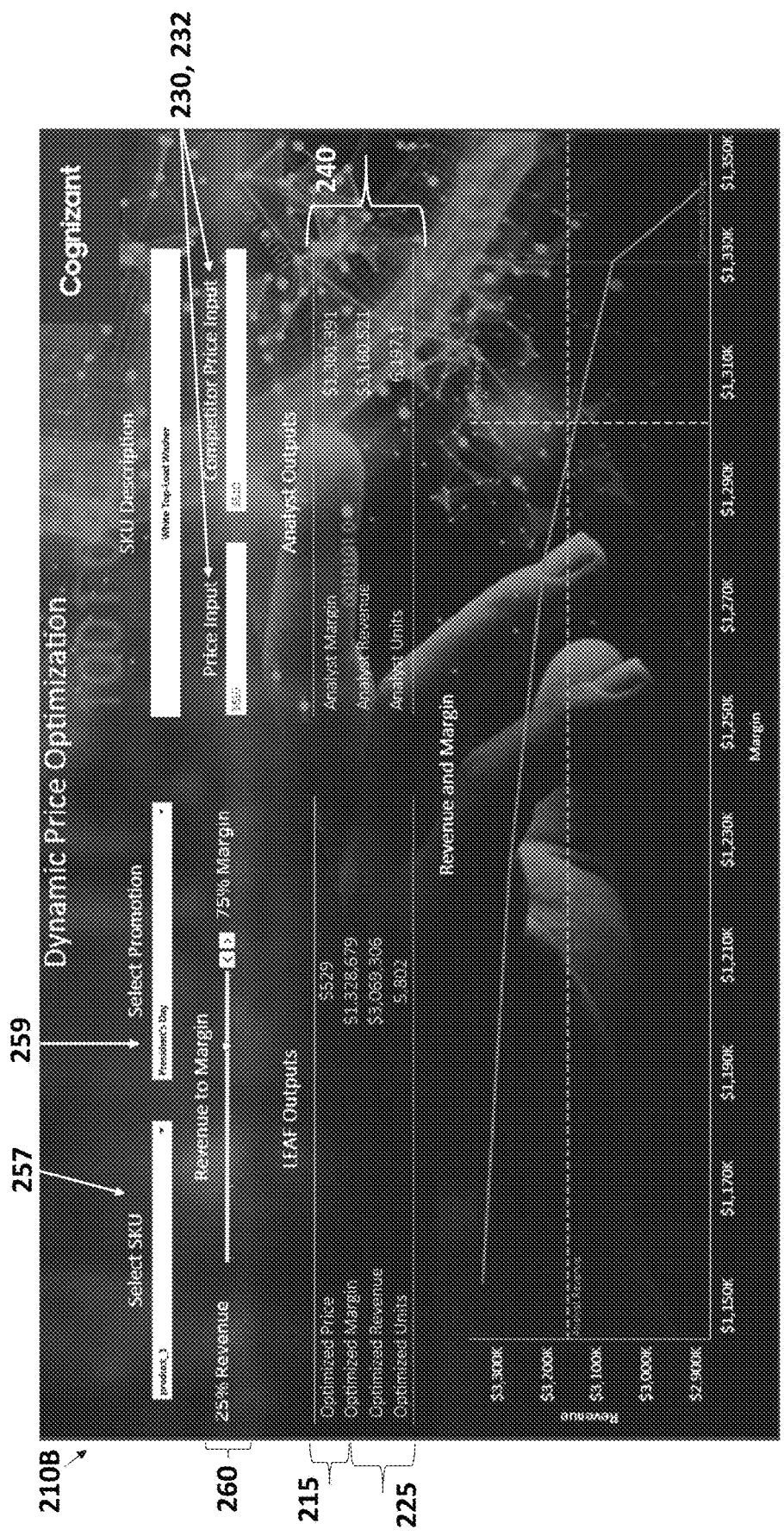
Figure 4F:
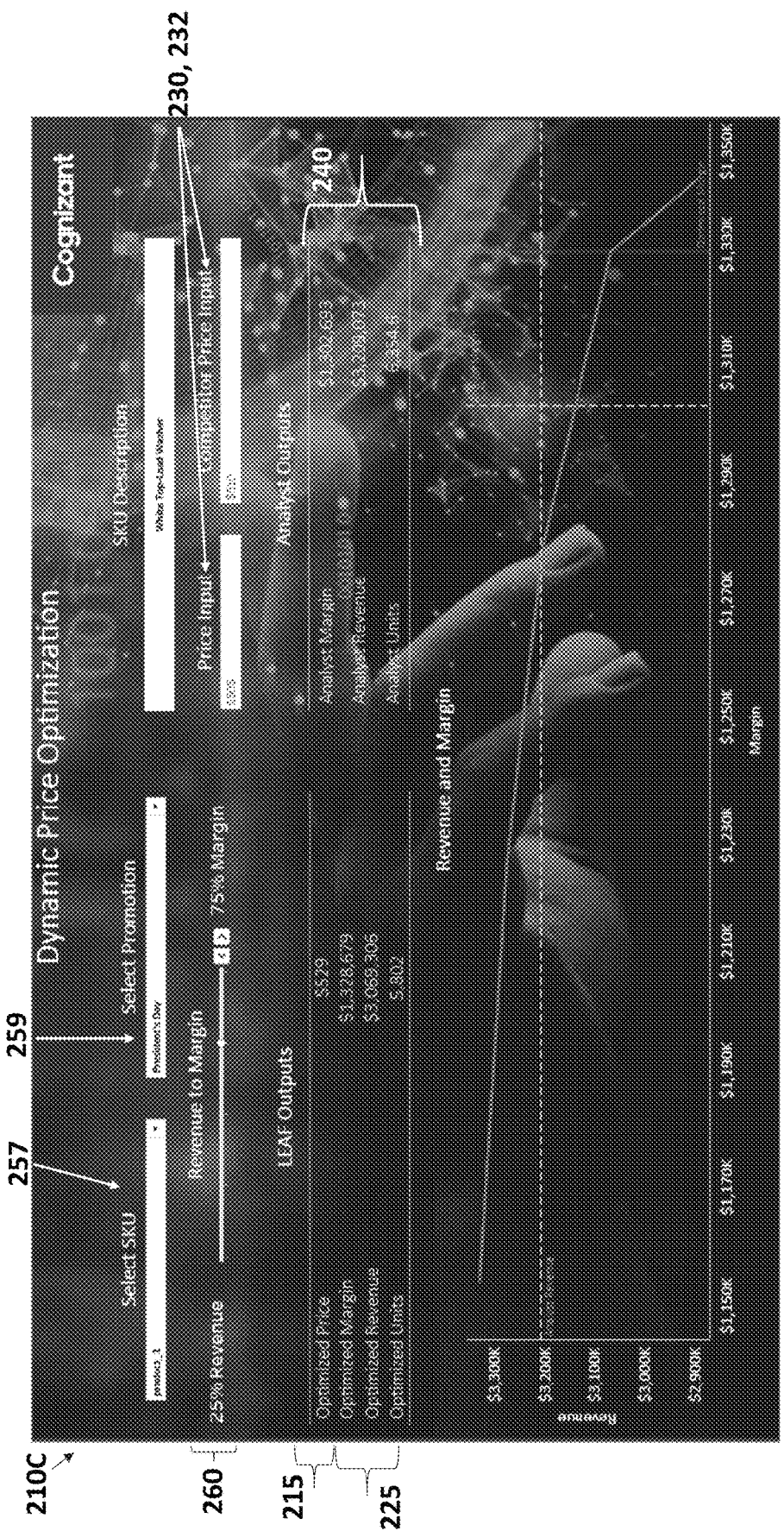

FIGS. 4d-4f are exemplary screenshots from implementation of the ESP and Scratchpad processes described herein as applied specifically to the problem of optimizing the retail price of a product, e.g., washing machine. The models learned on approximately 3 years of historical context (e.g., competitor prices, store space, location, store, retailerID, etc.), action (retail price) and outcome data (revenue (i.e. units sold), margin (price) tradeoff).

FIG. 4d is a first exemplary screen shot 210A illustrating a user-facing GUI which allows a user to view the recommendations including price (A) 215 and resulting quantity (units), revenue and margin (O) 225 from the ESP process described herein in accordance with selection of the product for review by one or both of SKU 257 and/or promotion (e.g., President's Day) 259. The screen shot 210A also includes dynamic features which may be selected by the user to evaluate and/or change the final solution. For example, slider 260 can be adjusted by the user to change the percentage contribution assigned to revenue and the percentage contribution assigned to margin. This changes the values for 215 and 225. An example is shown in second screenshot 210B of FIG. 4e, wherein the percentages were change to 25% revenue and 75% margin and the values changed as shown in Table 1.

TABLE 1

|  | Revenue to Margin: 50/50 | Revenue to Margin: 25/75 |
|---|---|---|
| Price | $499 | $529 |
| Margin | $1,278,732 | $1,328,679 |
| Revenue | $3,206,469 | $3,069,306 |
| Units | 6,426 | 5,082 |

FIG. 4f is a third exemplary screen shot 210C illustrating a user-facing GUI including Scratchpad input/output (i.e., Analyst) which further allows a user to vary the action, i.e., price 230 and/or competitor price 232, and generates revised outcomes 240 dependent thereon. As shown, when price input was lowered from $529 at the Revenue to Margin: 25/75, to $505 at the Revenue to Margin: 25/75, the resulting outcomes are shown in Table 2.

TABLE 2

|  | Revenue to Margin: 50/50 | Revenue to Margin: 25/75 | Revenue to Margin: 25/75 |
|---|---|---|---|
| Price | $499 | $529 | $505 |
| Margin | $1,278,732 | $1,328,679 | $1,302,693 |
| Revenue | $3,206,469 | $3,069,306 | $3,209,073 |
| Units | 6,426 | 5,082 | 6,354.6 |

Figure 4G:
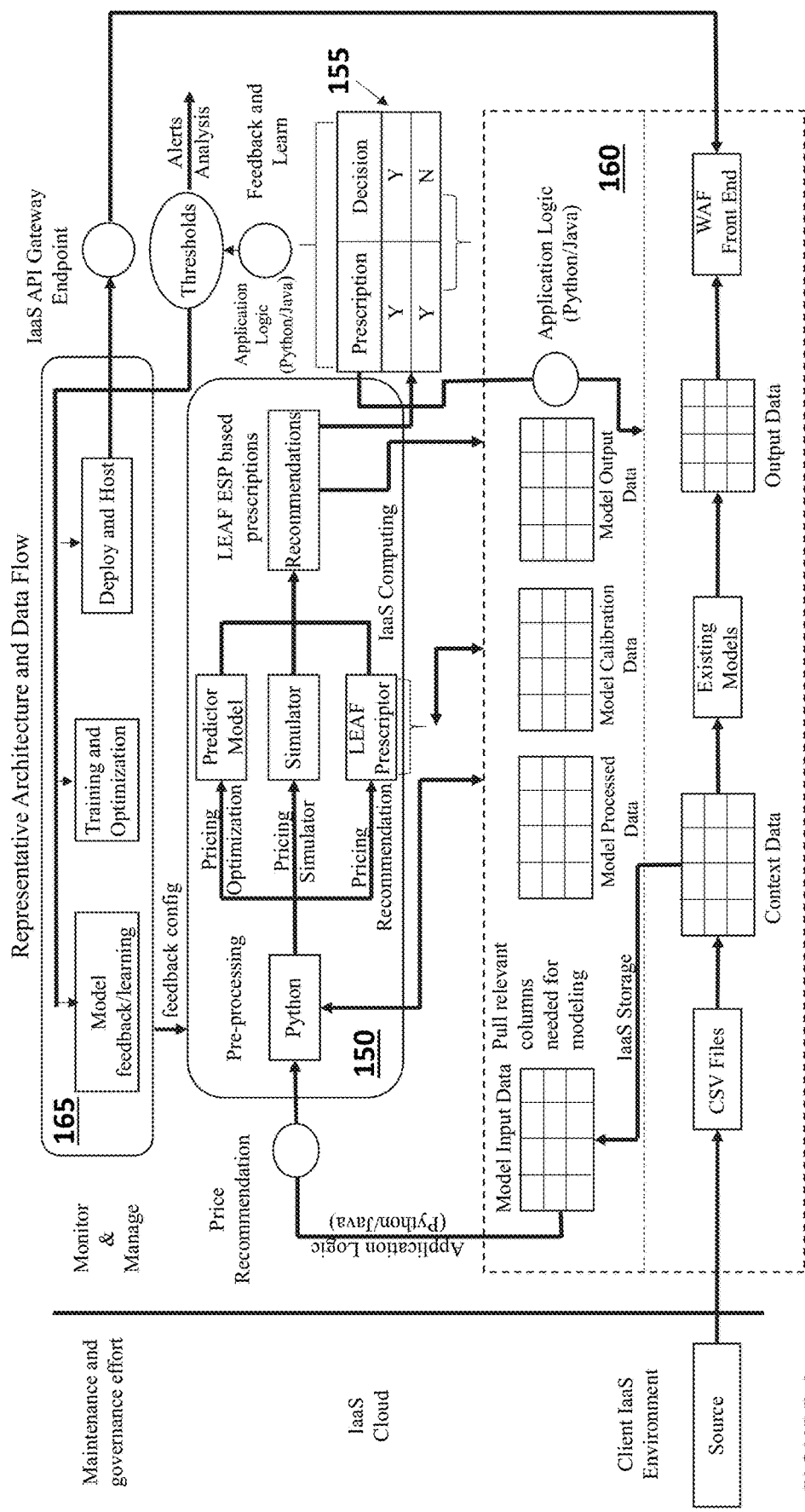

In FIG. 4g, a detailed exemplary system architecture for facilitating application of the ESP and Scratchpad functionality in the dual objective pricing optimization domain is shown. In this detailed architecture, a suite of Infrastructure as a Service (IaaS) products are utilized, including IaaS cloud services, computing and storage. One skilled in the art recognizes that there are numerous other IaaS providers which may be utilized to implement the functionality discussed herein, e.g., Amazon Web Service (AWS) products such as cloud storage (S3) and the Amazon Elastic Compute Cloud (EC2). The architecture also includes a cloud-based machine-learning platform (CMLP) such as Amazon Sage-Maker for creation, training, and deployment of the models and a web application framework (WAF) such as Angular. Additionally, one skilled in the art also recognizes that the infrastructure need not be cloud-hosted, so long as the necessary processing, storage, networks, and other fundamental computing resources for running the implementing-software are available. Further, certain functionality may be enabled, maintained, provided under a platform-as-a-service (PaaS), software-as-a-service or a combination thereof.

In FIG. 4g, primary subsystems and components include ESP system 150 (e.g., FIG. 4a), Scratchpad-enabled functionality 155 (e.g., FIGS. 4d, 4e, 4f), cloud storage 160, and a cloud-based machine-learning platform (CMLP) 165. One skilled in the art will appreciate that the CMLP enables maintenance and governance of the model training, optimization and deployment processes via a model management dashboard. Users may be alerted to the suitability of models when they meet pre-determined threshold error requirements as calculated using one or more statistical measures, e.g., mean absolute percentage error (MAPE).

Figure 4H:
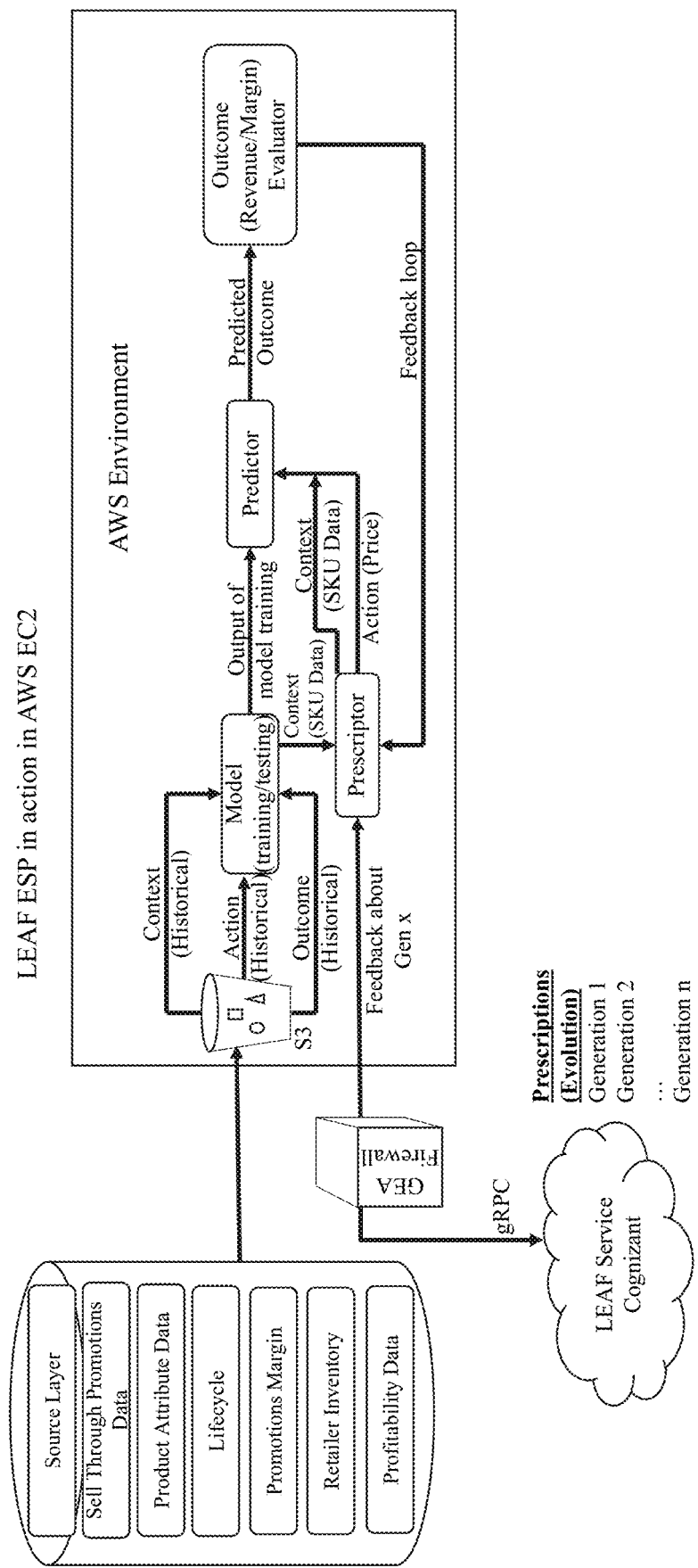

As discussed above, much if the functionality may be hosted in the cloud. And certain processes and functions may be hosted and run by different entities and in a fashion wherein data is protected. Referring to FIG. 4h, the evolution of the Prescriptor may be offered as an evolution-as-a-service (EaaS) product, wherein a client's sensitive data does stays behind its firewall as shown. A detailed description of an exemplary EaaS is described in co-owned U.S. patent application Ser. No. 16/424,686 entitled SYSTEMS AND METHODS FOR PROVIDING SECURE EVOLUTION AS A SERVICE, which is incorporated herein by reference in its entirety.

Figure 5A:
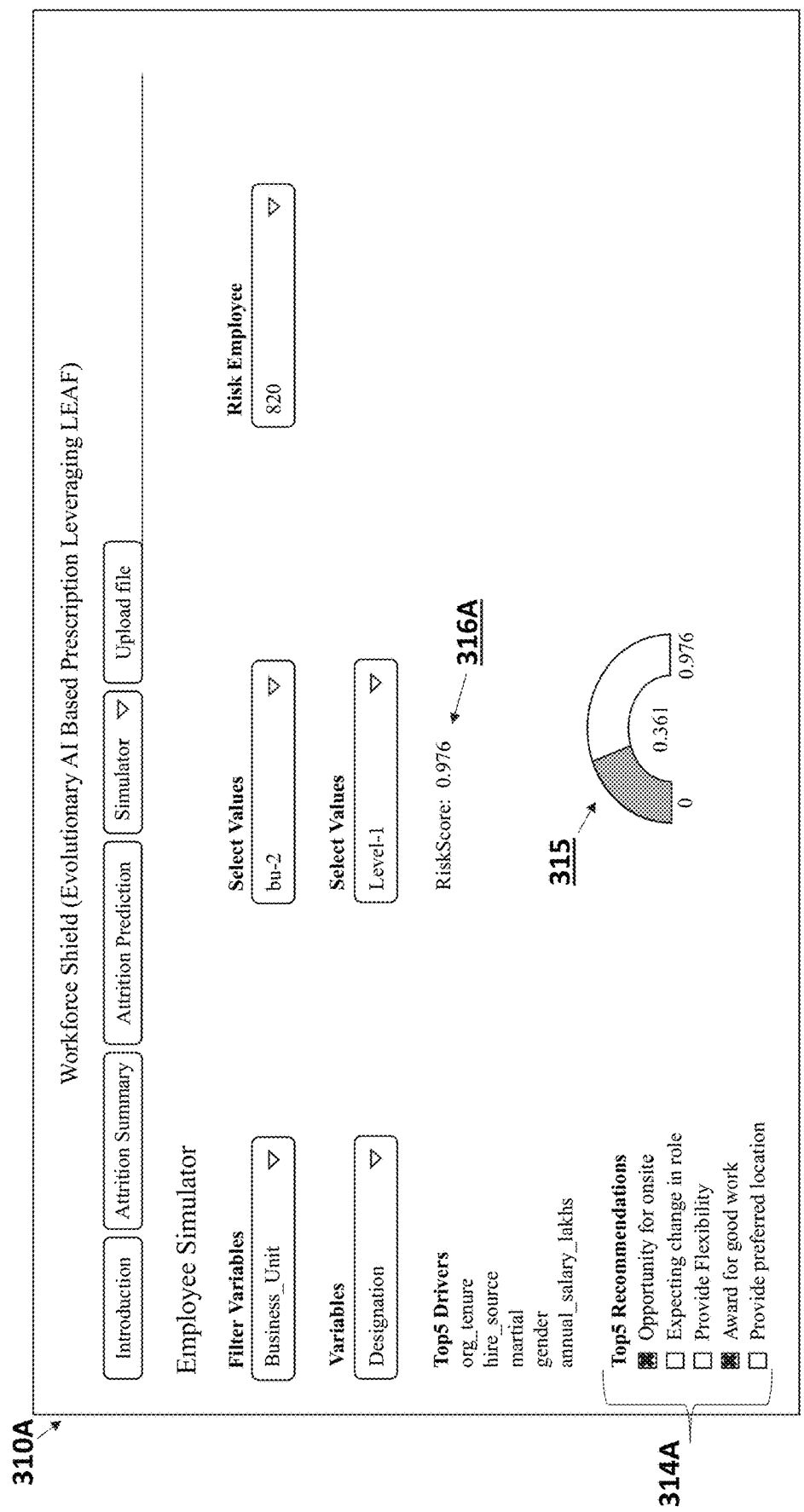
Figure 5C:
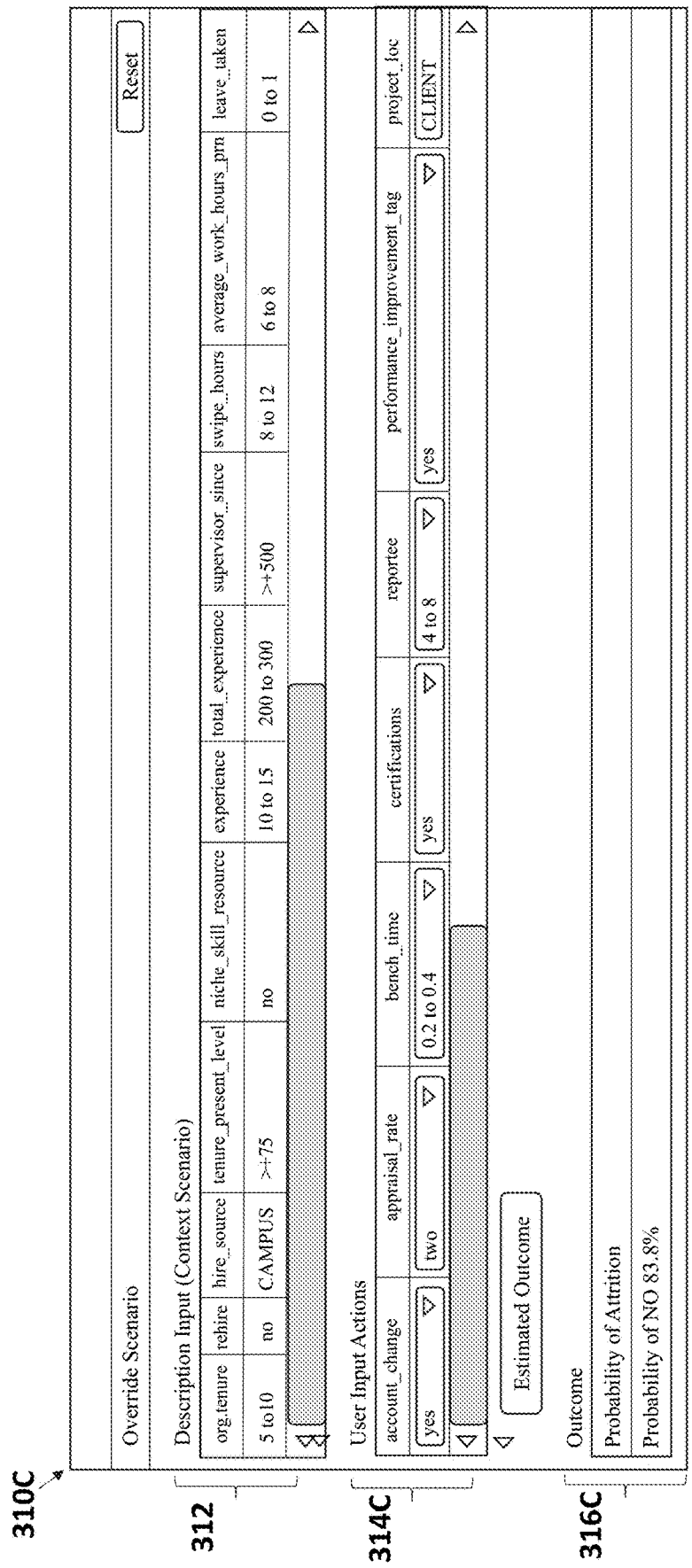

In yet another example, wherein the ESP and Scratchpad functionality are applied to a different problem, the GUI screenshots in FIGS. 5a-5c illustrate a scenario wherein the ESP Prescriptor suggests optimal actions to be taken to retain individual employees. In FIG. 5a, a GUI screenshot 310A shows the top recommendations 314A, i.e., Actions (A), to mitigate attrition of employee no. 820. Here, the prescribed solution evolved using ESP, predicts a RiskScore, i.e., probability of attrition 316A as 0.976 when none of the prescribed recommendations 314A are implemented. The Scratchpad functionality gives the user the ability to select one or more of the prescribed recommendations 314A to see how the RiskScore is predicted to change via the visual indicator 315. In the specific example shown in FIG. 5a, when prescribed recommendations "opportunity for onsite" and "award for good work" are selected, the visual indicator 315 shows that the RiskScore drops from 0.976 to 0.361, a substantial decrease.

In screen shot 310B of FIG. 5b, the context data 312B input to the Prescriptor may include, but is not limited to, the following data regarding an individual employee: tenure with organization; rehire, hire source, e.g., campus (university) or lateral; data regarding tenure at the present level; whether the employee offers niche skills, metrics indicating experience; time as a supervisor; leave taken; average work hours; etc. This list is not exhaustive. The Prescriptor, i.e., neural network, uses the context input to evolve solutions over a certain number of generations to ascertain optimal actions to achieve desired outcome, i.e., lower probability of attrition—or as shown in FIG. 5b, a high probability of NO attrition. The optimal actions which result in the optimal outcome are the prescribed actions 314B. Exemplary actions 314 which may be prescribed include, but are not limited to: account change; appraisal rates; bench time; certifications; reporting required, performance improvement indicators; project location; onsite duration, skill proficiency, reward recognition, etc. This list is not exhaustive. The optimal outcome is reported as Probability of NO [Attrition] 316B using the prescribed actions. In the very particular example shown in FIG. 5b, taking the prescribed actions with respect to the identified employee suggests a retention percentage of 90.5% for that employee.

Referring now to FIG. 5c, the screen shot 310C facilitates the Scratchpad functionality, referred to as Override Scenario, wherein a user may alter one or more of the prescribed actions 314C to see how the alterations would impact the predicted outcome, i.e., retention percentage. Table 3 shows a comparison of prescribed action to user input actions and the resulting change in retention percentages.

TABLE 3

| Action Type | Prescribed Action | User Input Action |
|---|---|---|
| Account_change | Yes | Yes |
| Appraisal_rate | One | Two |
| Bench_time | +0.8 | 0.2-0.4 |
| Certifications | No | Yes |
| Reportee | 0 to 4 | 4 to 8 |
| Performance_improvement_tag | No | Yes |
| Project_location | Company | Client |
| Probability of NO attrition | 90.5% | 83.8% |

Application of ESP and Scratchpad functionality is of course not limited to business use cases. By way of example, other domains which may benefit from the processes described herein are the medical or health domains, including public health. As discussed in U.S. Provisional Patent Application No. 63/049,370, the contents of which is incorporated herein by reference in its entirety, the ESP approach could be applied to the timely problem of determining optimal non-pharmaceutical interventions ("NPIs") for addressing the COVID-19 pandemic. Using the data-driven LSTM model as the Predictor (FIG. 6b), a Prescriptor is evolved in a multi-objective setting to minimize the number of COVID-19 cases, as well as the number and stringency of NPIs (representing economic impact). In the case of the NPI optimization problem, context (C) consists of information regarding a region (e.g., country). This might include data on the number of available ICU beds, population distribution, time since the first case of the disease, current COVID-19 cases, and fatality rate. Actions (A) in this case specify whether or not the different possible NPIs are implemented within that region. The outcomes (O) for each decision measure the number of cases and fatalities within two weeks of the decision, and the cost of each NPI.

In this process, evolution discovers a Pareto front of Prescriptors that represent different tradeoffs between these two objectives. Some evolved Prescriptors utilize many NPIs to bring down the number of cases, and others minimize the number of NPIs with a cost of more cases. The AI system is not designed to replace human decision makers, but instead to empowers them to choose which tradeoffs are the best, and the AI makes suggestions on how they can be achieved, i.e., what Actions to take. It therefore constitutes a step towards using AI not just to model the pandemic to predict what might happen in the future, but to prescribe actions to take, e.g., what NPIs to implement and when to implement them, to help contain or mitigate the predicted impacts of the pandemic.

Specifically, for this exemplary NPI optimization task, ESP is built to prescribe the NPIs for the current day such that the number of cases and cost that would result in the next two weeks is optimized. The initial NPI dataset is based on datasets from Oxford University's Blavatnik School of Government which provides number of cases, deaths and NPIs for most countries on a daily basis. FIG. 6a provides details for the eight kinds of NPIs and range of stringency identified in the dataset. Together with data on daily cases, this NPI data is used to train the LSTM Predictor model.

Figure 6B:
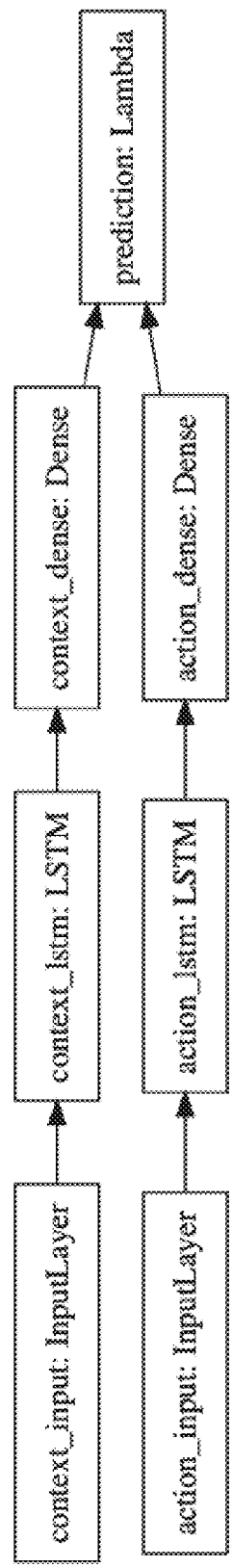

FIG. 6b shows the Keras representation of the learnable predictor model. The previous 21 days of $R_{n-t}$ are fed into the context_input, wherein n is the day; the previous 21 days of stringency values for the eight NPIs are fed into the action_input. The Lambda layer combines the context branch h and the action branch g as specified in Equation 1 below to produce a prediction $R_n$. The effects of social distancing, $g(A_n)$, and endogenous growth rate, $h(r_n)$, of the pandemic are processed in separate LSTM models, making it possible to ensure that stringency has a monotonic effect, resulting in more regular predictions.

$$R_n = f(A_n, r_n) = (1 - g(A_n))h(r_n)$$

$$\text{with } g(A_n) \in [0, 1] \text{ and } h(r_n) \geq 0.$$

Figure 6C:
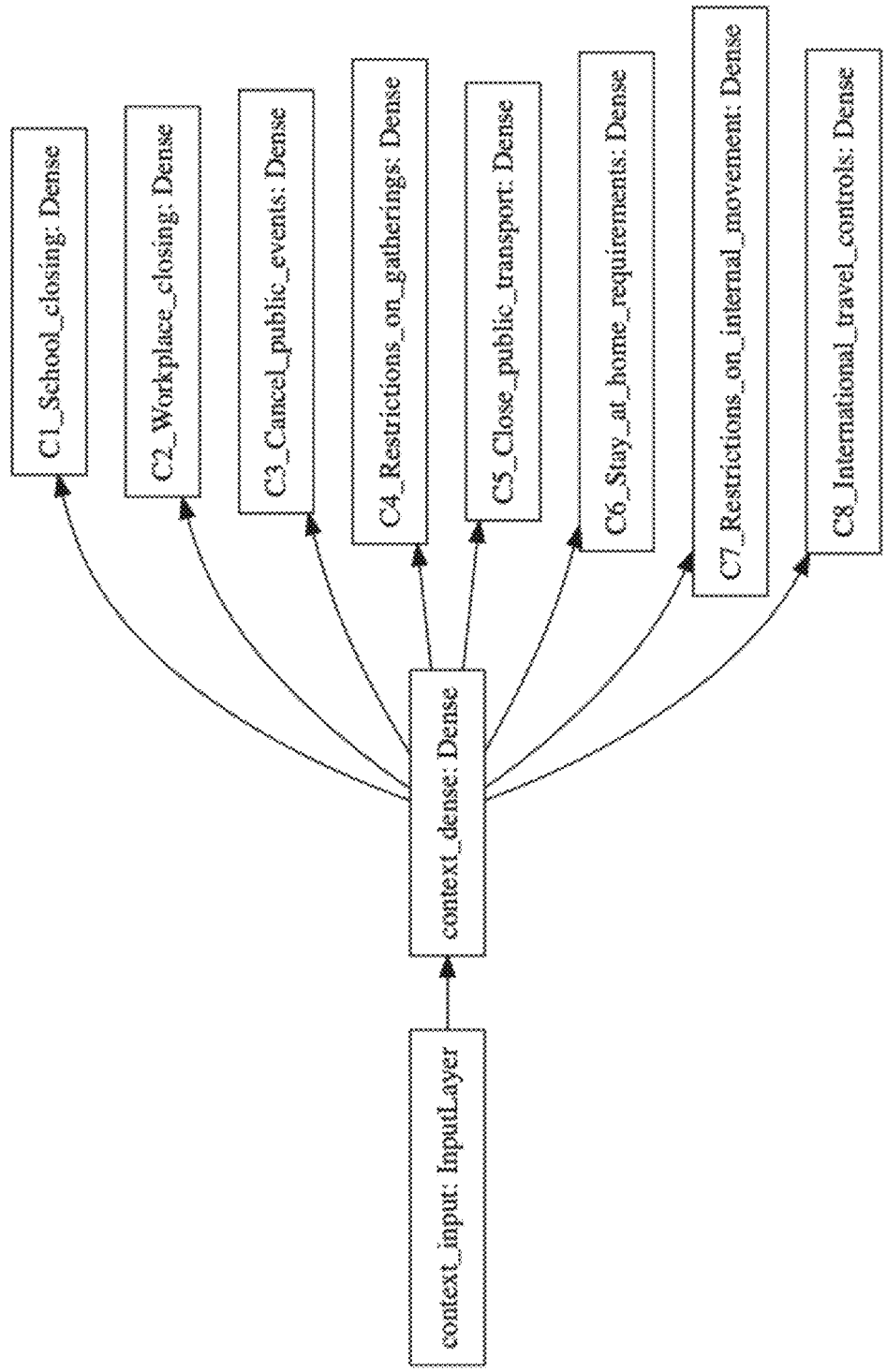

The Prescriptor NN representation is shown in FIG. 6c, wherein given 21 past days of case information ($R_{n-t}$) as input (context_input), the Prescriptor generates recommended stringency values for each of the eight NPIs. The Prescriptor is fully connected with one hidden layer. Because there are no targets, i.e. the optimal NPIs are not known, gradient descent cannot be used; instead, all weights and biases are evolved based on how well the network's NPI recommendations work along the cases and cost objectives, as predicted by the Predictor.

Prescriptor candidates are evaluated according to two objectives: (1) the expected number of cases according to the prescribed NPIs, and (2) the total stringency of the prescribed NPIs (i.e. the sum of the stringency levels of the eight NPIs), serving as a proxy for their economic cost. For the present example, both measures are averaged over the next 180 days and over the 20 countries with the most deaths in the historical data. Both objectives have to be minimized.

On the evaluation start date, each Prescriptor is fed with the last 21 days of case information. Its outputs are used as the NPIs at the evaluation start date, and combined with the NPIs for the previous 20 days. These 21 days of case information and NPIs are given to the Predictor as input, and it outputs the predicted case information for the next day. This output is used as the most recent input for the next day, and the process continues for the next 180 days. At the end of the process, the average number of predicted new cases over the 180-day period is used as the value of the first objective. Similarly, the average of daily stringencies of the prescribed NPIs over the 180-day period is used as the value for the second objective.

Figure 6D:
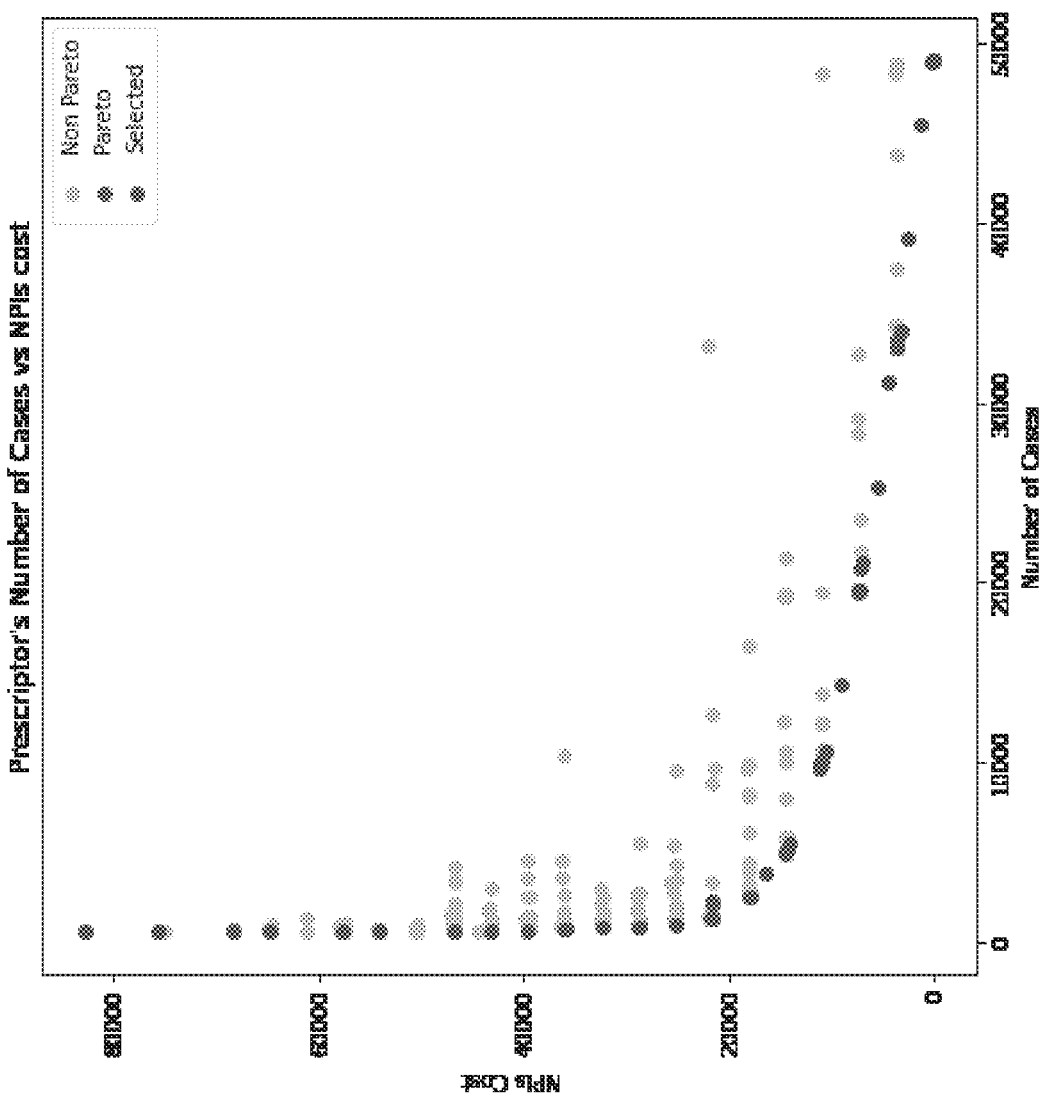

After each candidate is evaluated in this manner, the next generation of candidates is generated. Evolution is run for 110 generations, or approximately 72 hours, on a single CPU host. During the course of evolution, candidates are discovered that are increasingly more fit along the two objectives. In the end, the collection of candidates that represent best possible tradeoffs between objectives (the Pareto front, i.e. the set of candidates that are better than all other candidates in at least one objective) is the final result of the experiment. FIG. 6d illustrates this Pareto front for the present example, where the final population of prescriptors are charted along the case number and cost objectives. From this collection, it is up to the human decision maker to pick the tradeoff that achieves a desirable balance between cases and cost. Or put in another way, given a desired balance, the ESP system will find the best to achieve it (i.e. with the lowest cost and the lowest number of cases).

Figure 6E:
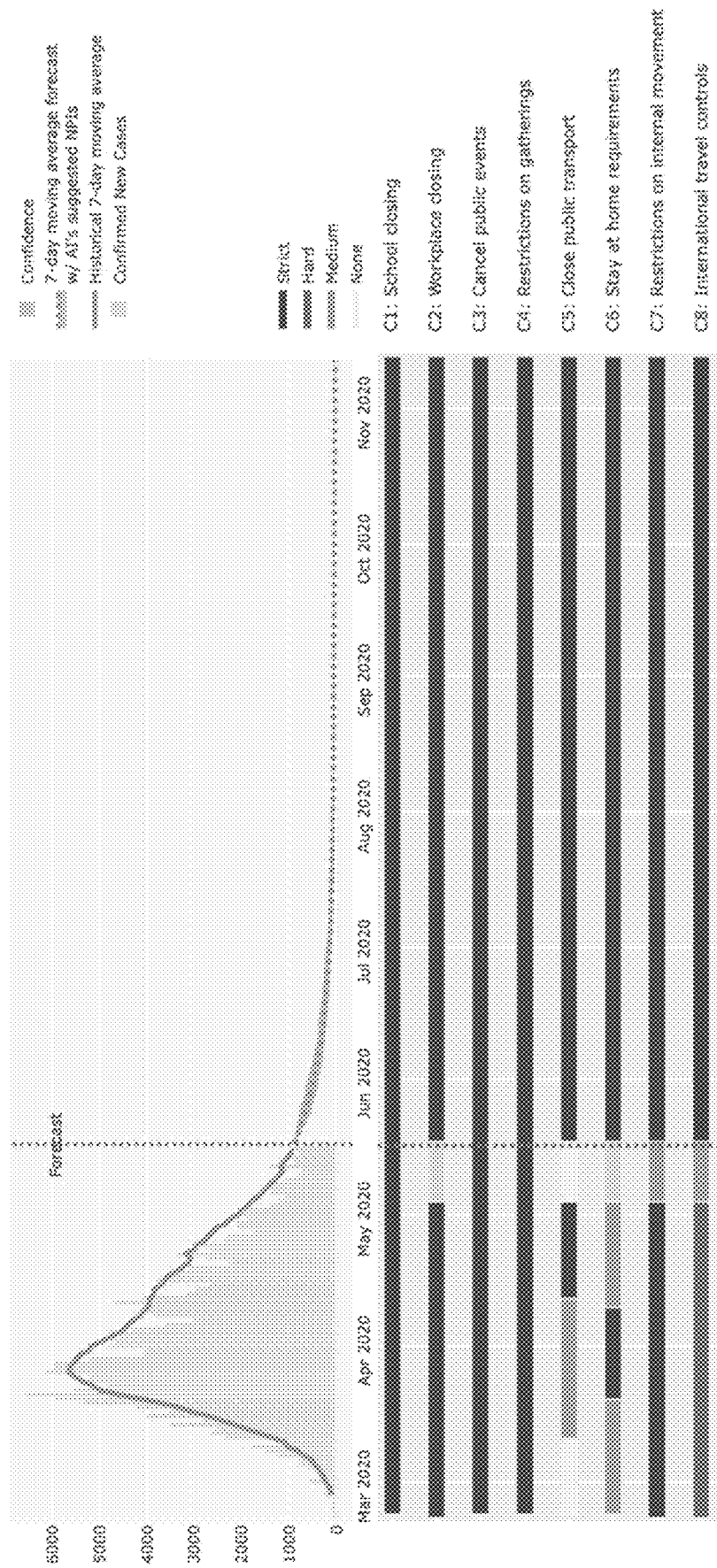
Figure 6F:
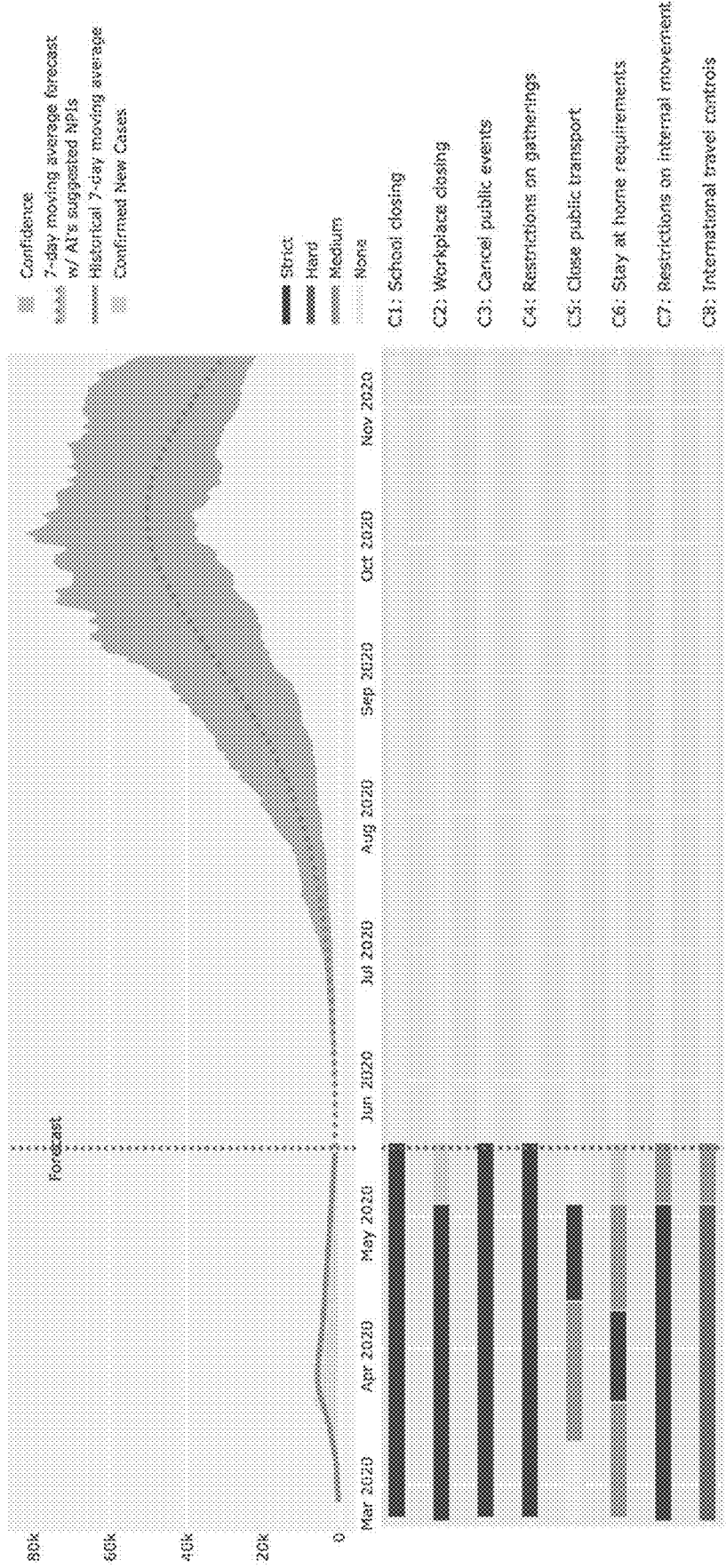
Figure 6G:
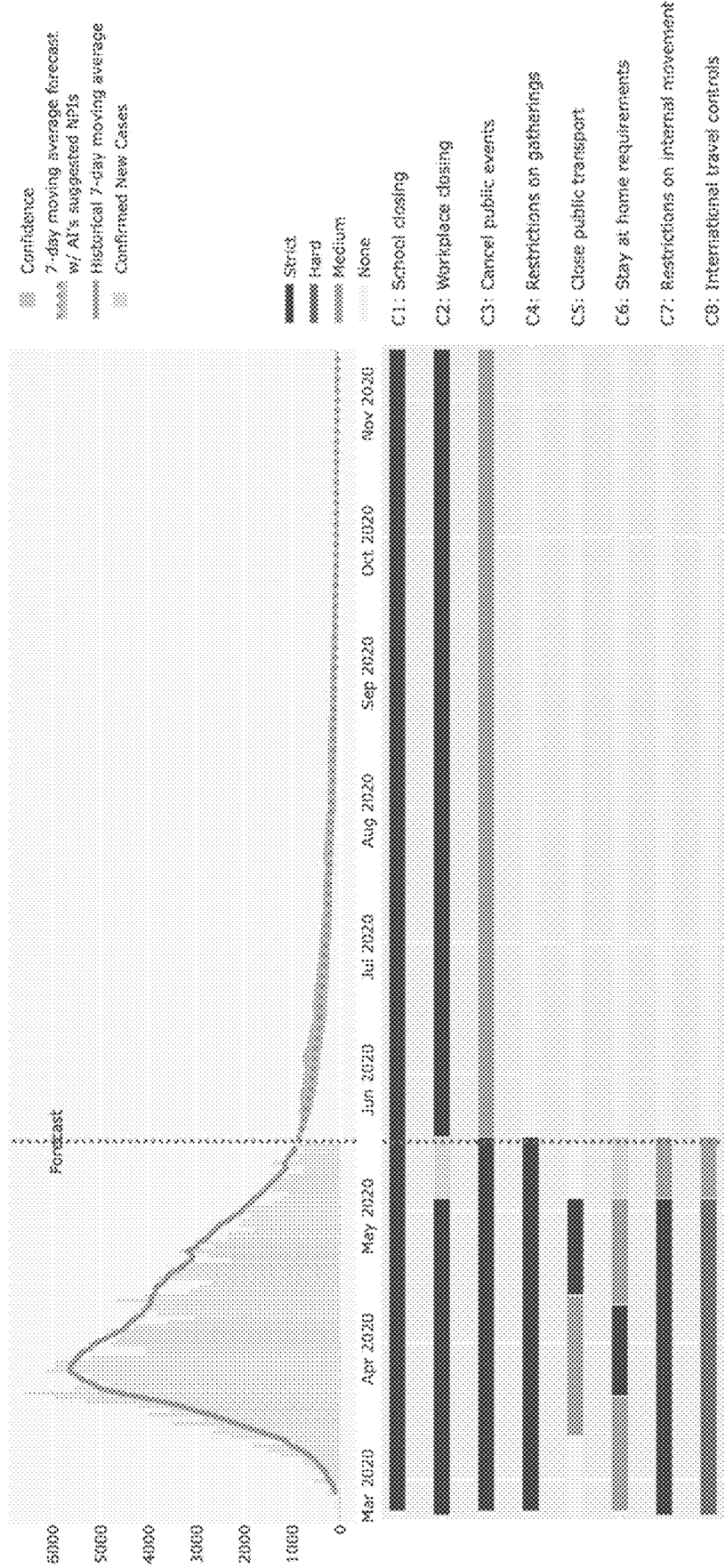
Figure 6H:
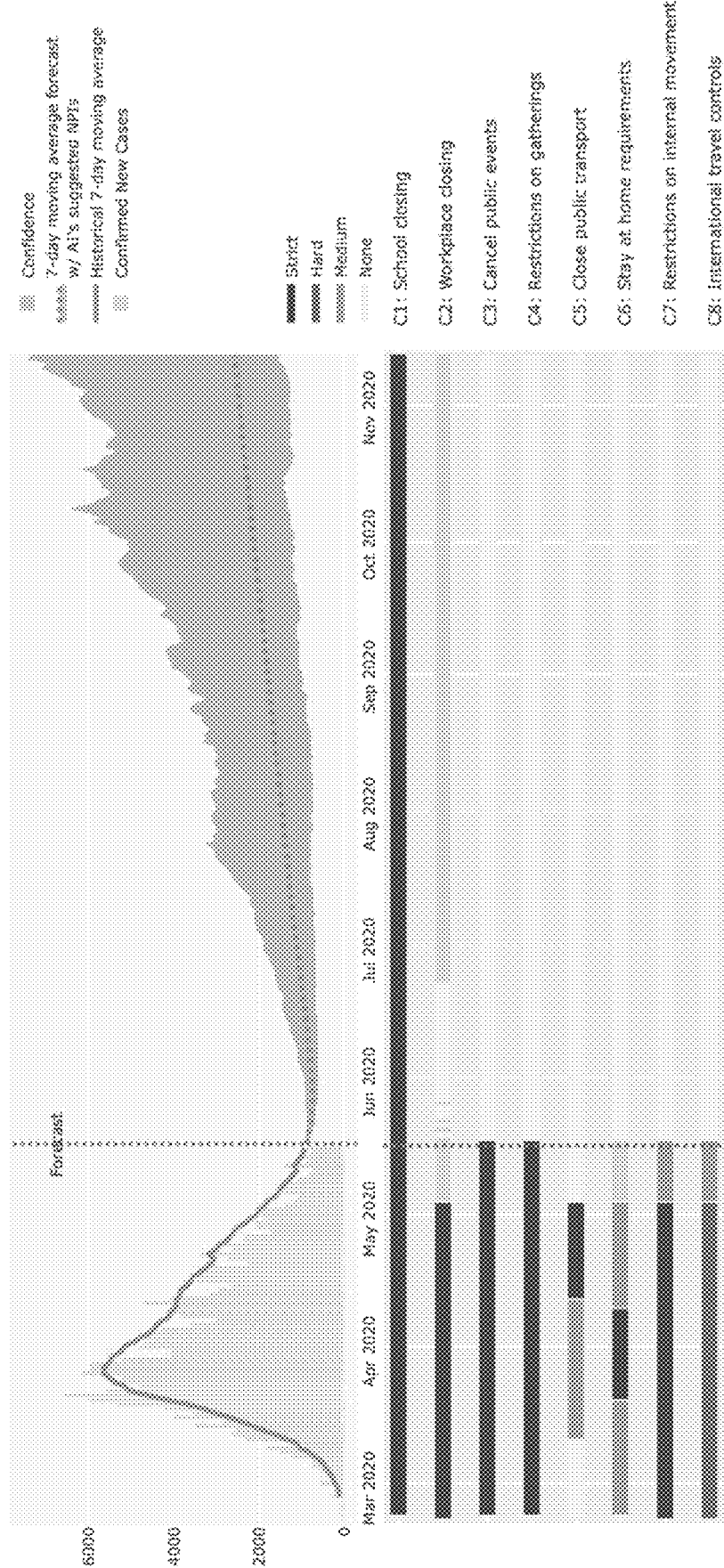

To illustrate these different tradeoffs, FIGS. 6e, 6f, 6g and 6h show the NPI Prescriptions and the resulting forecasts for four different Prescriptors from the Pareto front for one country, Italy, on May 18, 2020. Daily cases are shown as orange vertical bars and their seven-day moving average as the orange line. The vertical line indicates the start of the forecast, and the gray area represents uncertainty around the prediction. The NPI prescriptions are shown below the case plot as horizontal bars, with color representing stringency. FIG. 6e is the Prescriptor that minimizes the number of cases and recommends a full set of NPIs at their maximum level of stringency. FIG. 6f is the Prescriptor that minimizes the NPI stringency recommends lifting all NPIs, which is likely to result in a high number of cases. FIG. 6g is the Prescriptor that tries to minimize the number of cases while lifting as many NPIs as possible recommends keeping restrictions mostly on schools and workplaces. And FIG. 6h is the Prescriptor that tries to reduce the cost more by opening up workplaces completely may result in cases climbing up. The human decision maker can explore the tradeoffs between cases and cost, and the ESP system will recommend the best ways to achieve it.

Figure 6I:
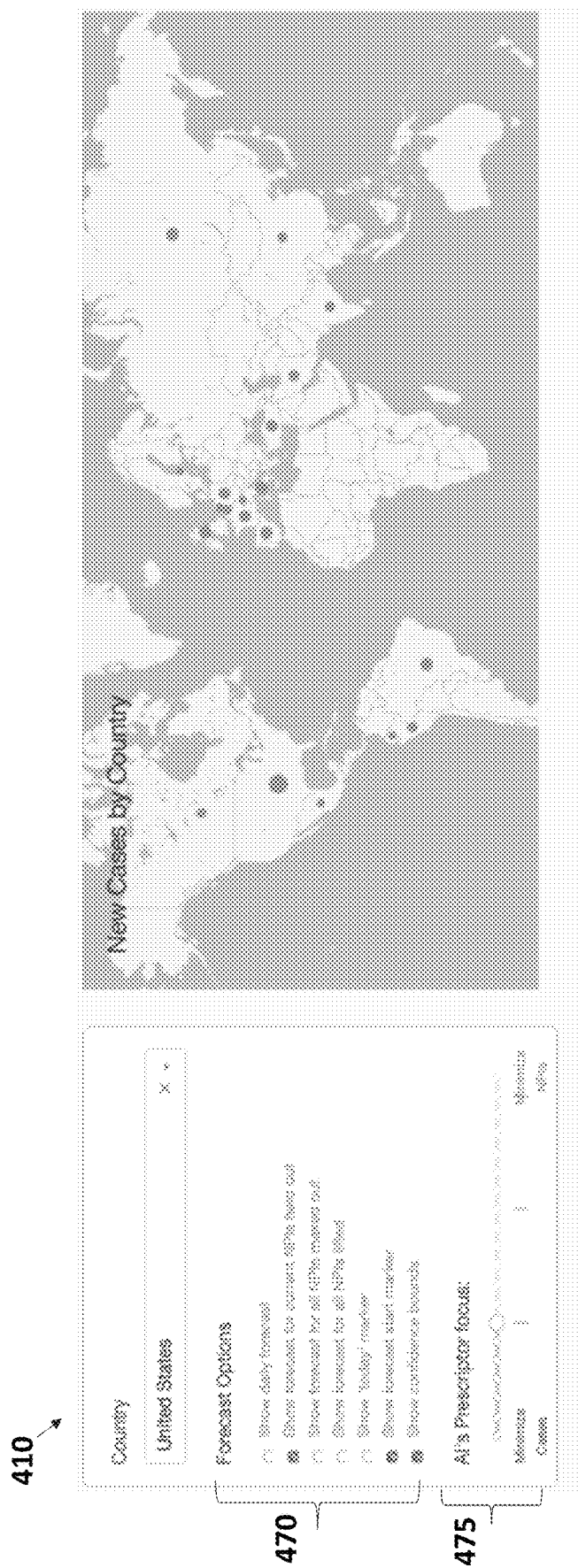
Figure 6J:
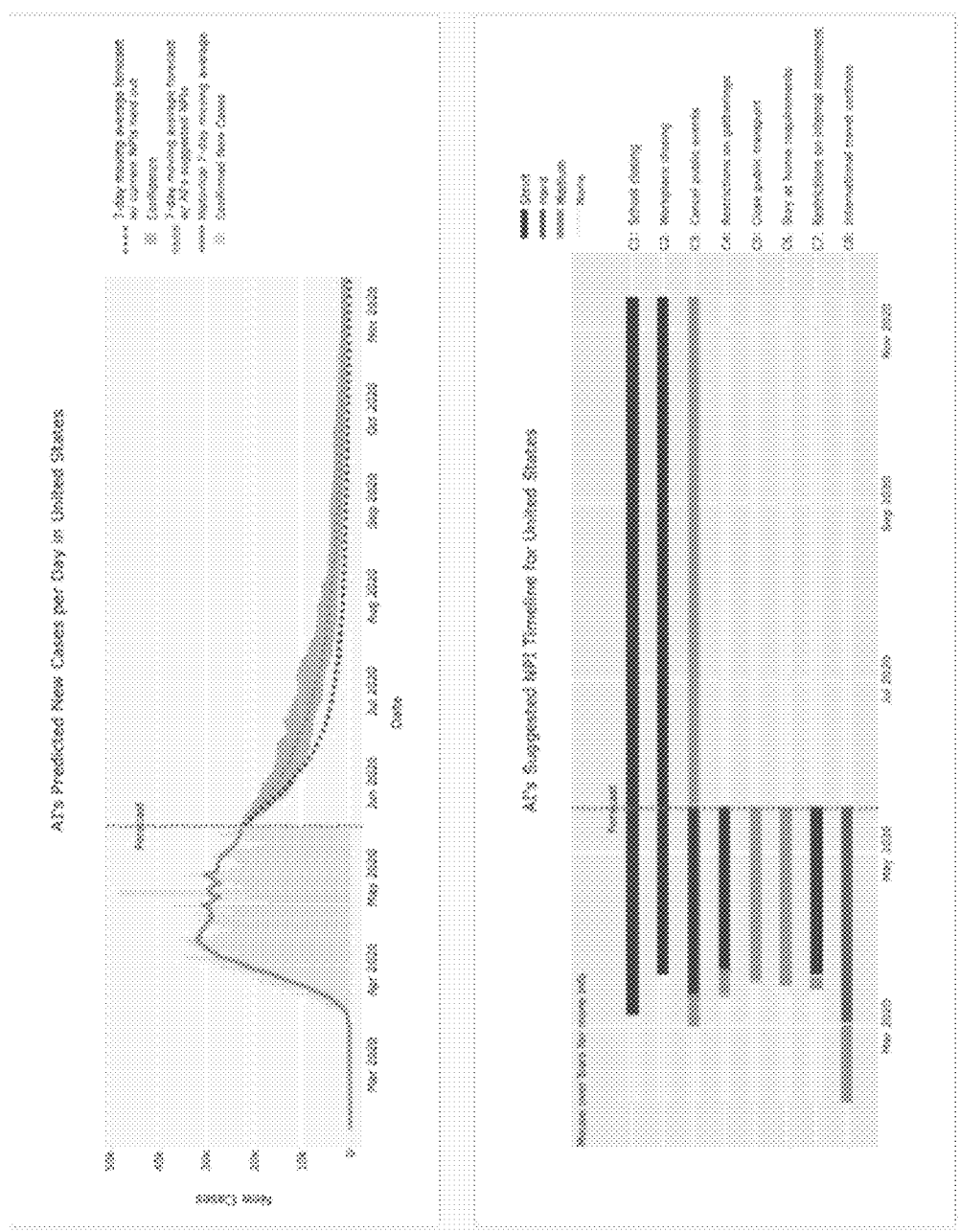

FIG. 6i shows an exemplary GUI screenshot 410 which allows a user to make selections as to which forecast options 470 to be shown/viewed and to vary the Prescriptor focus between minimizing number of COVID cases and minimizing the number of NPIs via a selection mechanism, e.g., slider 475. And FIG. 6j shows the result of the selections made in FIG. 6i. Further, the availability of Scratchpad functionality will allow a user to not only see the prescription details selected and shown in FIGS. 6e-6j, but also to modify them by hand. In this manner, before any prescriptions are deployed, the user can utilize expert knowledge that may not be available for ESP. For instance, some NPIs in some countries may not be feasible or enforceable at a given time. The interface makes it possible to explore alternatives, and see the resulting outcome predictions immediately. In this manner, the user may find more refined prescriptions than those proposed by ESP, or convince the user that they are unlikely to exist.

Figure 7:
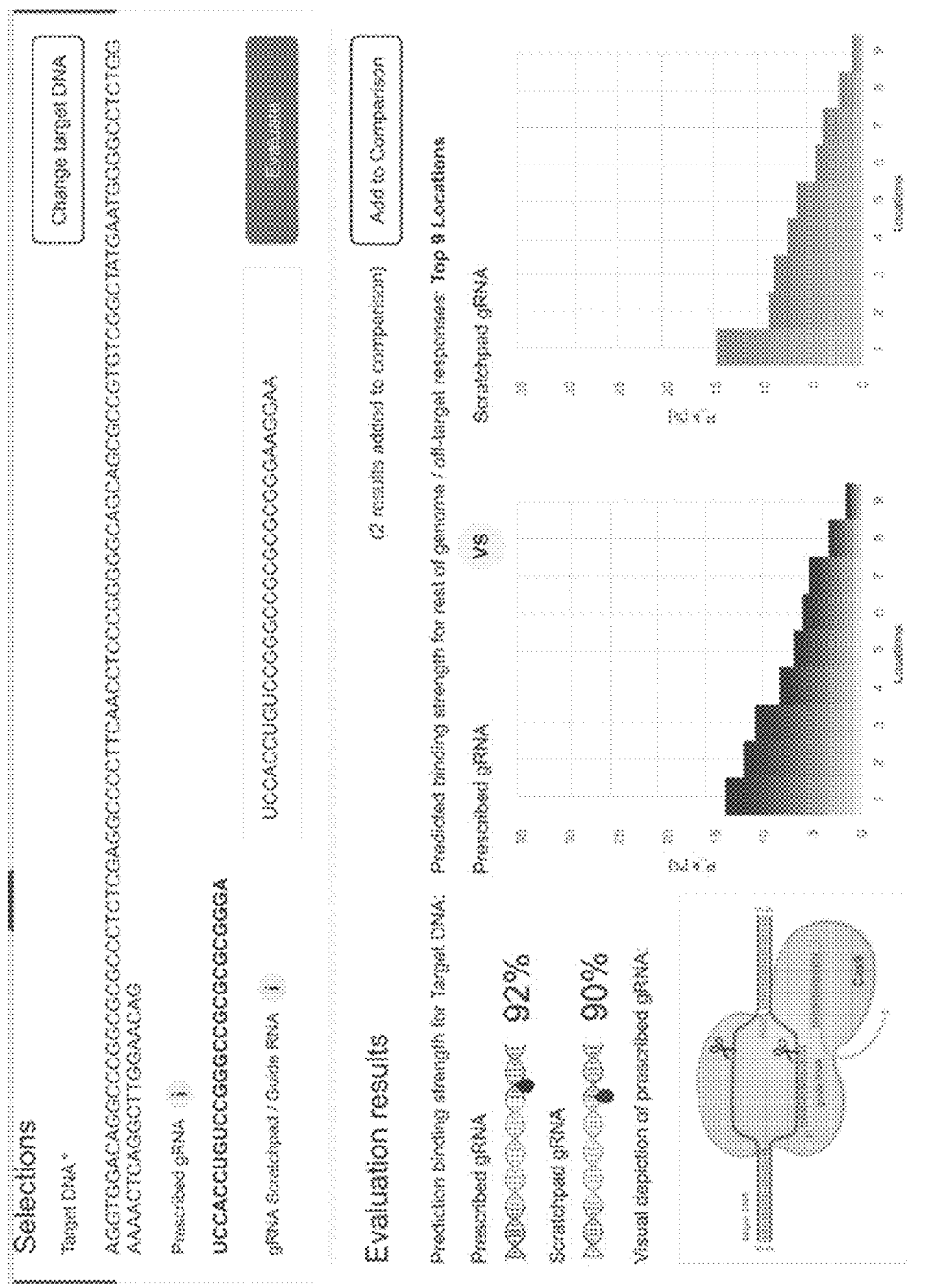
FIG. 7 illustrates a sixth exemplary application of the embodiment described herein to the problem of designing optimal guide RNA (gRNA) sequences.

FIG. 7 shows an exemplary GUI implementation of ESP with Scratchpad functionality applied to a different problem: Designing optimal guide RNA (gRNA) sequences for the CRISPR gene editing technique such that the gRNA binds only to the desired sites in the DNA and not to other sites. The DNA sequence generated by the Prescriptor is shown in the Prescribed gRNA field. The Scratchpad gRNA field allows editing this sequence by the nucleotide. The predicted binding strength to the target site is shown in percentages (92% and 90%). The distribution of binding strengths of both Prescriptor-generated gRNA and scratchpad gRNA to the nine top non-target sites are shown to the right. Again, the user can choose to add the modified design to the set of saved comparisons from which s/he can choose the final solution later.

Figure 8:
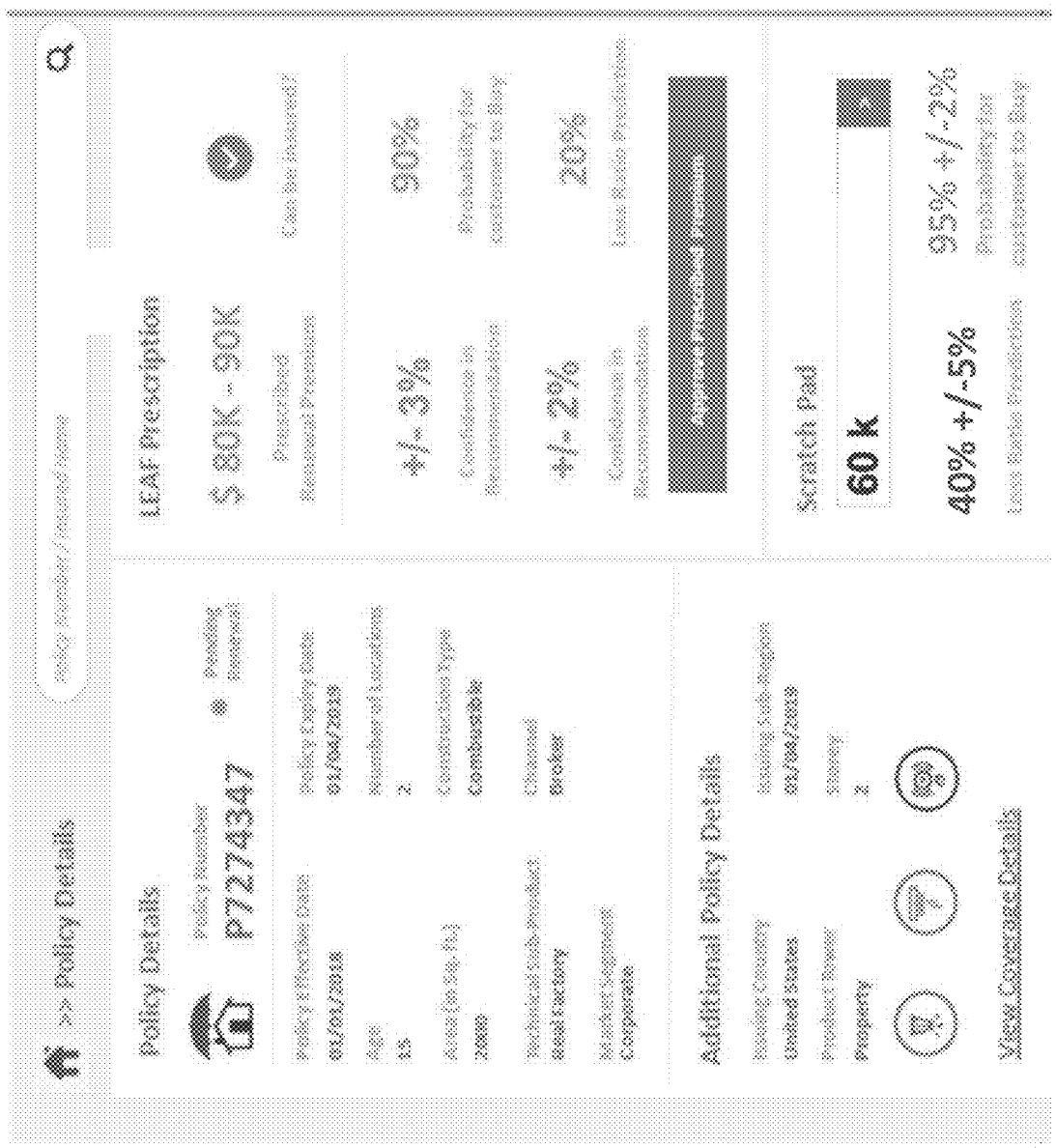
FIG. 8 illustrates a sixth exemplary application of the embodiment described herein to the problem of insurance underwriting.

And in yet another example discussed with reference to FIG. 8, ESP is applied to the problem of deciding whether an insurance underwriter should make an offer for insuring a given property, and at what premium. The outcomes are the probability that the customer will buy the insurance (which the underwriter wants to be as high as possible), and the predicted Loss Ratio (which the underwriter wants to be as low as possible). The prescriptions generated by the ESP process are indicated on top right of the GUI screenshot, and the predictions, with confidence windows, are just below, e.g., 90% (+/−3% confidence in the recommendation) probability for customer to buy and 20% (+/−2% confidence in the recommendation) loss ratio. The Scratchpad feature is shown at the bottom right where the user is able to adjust the premium amount and scratchpad returns commensurate changes in probability for customer to buy and loss ratio for the modified actions, with commensurate updates to confidence. In the example shown, the user is exploring a lower premium ($60K), and the system estimates an improved probability that the customer will accept (95% vs. 90% with +/−5% confidence), but a worse Loss Ratio (40% vs. 20% with +/−2% confidence). One skilled in the art will recognize that confidence windows are not an essential feature of the output (see, e.g., FIGS. 7, wherein just probabilities alone are displayed). The generation and display of confidence windows could be a user selectable feature of a product incorporating the processes described herein.

Similar to the above examples, the Scratchpad technology can be applied to any application of the ESP system, and to any other similar machine learning platform that utilizes a surrogate model to discover designs, strategies, allocations, etc. that optimize objectives such as performance, cost, side effects, etc.

It is submitted that one skilled in the art would understand the various computing environments, including computer readable mediums, which may be used to implement the methods described herein. Selection of computing environment and individual components may be determined in accordance with memory requirements, processing requirements, security requirements and the like. Further, portions of the process described herein may be provided as part of a software as a service (SaaS) model and supported by infrastructure as a service (IaaS) as discussed herein. Further still, different aspects of the process may be performed at different physical locations and/or under different security schemes, e.g., to protect confidential business, patient, personal data. It is submitted that one or more steps or combinations of step of the methods described herein may be developed locally or remotely, i.e., on a remote physical computer or virtual machine (VM). Virtual machines may be hosted on cloud-based IaaS platforms such as Amazon Web Services (AWS) and Google Cloud Platform (GCP), which are configurable in accordance memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implement one or more of the features, components and methods described herein, the following articles are referenced and incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Cistrons of Innoarchtech, published online by O'Reilly Media, Copyright InnoArchTech LLC 2020.

The invention claimed is:

1. A computer-implemented process for evolving an optimized prescriptor model for determining optimal decision policy outcomes related to an identified problem comprising:

building a predictor surrogate model based on historical training data to predict an outcome;

feeding the predictor surrogate model into an evolutionary algorithm framework to evolve a prescriptor model over multiple generations, wherein subsequent generations are evolved based on results of prior generations until at least one optimized prescriptor model is determined, the optimized prescriptor model including optimal actions (A);

providing the optimal prescriptor actions (A) identified by the at least one optimized prescriptor model to the predictor surrogate model to generate an optimal outcome result (O) based thereon;

displaying the optimal prescriptor actions (A) with the optimal outcome result (O) to a user;

providing at least one first selection component to the user to modify at least one value for one or more of the optimal prescriptor actions (A) to generate a modified prescriptor model and one or more modified actions ($A^m$);

providing the one or more modified actions ($A^m$) to the predictor surrogate model to generate a modified outcome result ($O^m$); and displaying at least the modified outcome result ($O^m$) to the user.

2. The process of claim 1, wherein the historical training data includes both context training data and action training data related to the identified problem.

3. The process of claim 1, further comprising: displaying both the modified outcome result ($O^m$) and the optimal outcome result (O) for comparison.

4. The process of claim 1, wherein the at least one first selection component is a computer-generated graphical user interface selector selected from the group consisting of: radio button, slider, toggle, side-to-side arrows and dropdown arrows.

5. The process of claim 1, wherein the at least one optimized prescriptor model is determined from a Pareto-front of multiple evolved prescriptor models.

6. The process of claim 5, wherein each of the multiple evolved prescriptor models in the Pareto-front is generated responsive to balancing multiple objectives underlying a decision policy.

7. The process of claim 6, further comprising:
providing a second selection component to the user to vary a percentage contribution to a balance between the multiple objectives, wherein varying the percentage contribution changes the at least one optimized prescriptor model to a changed prescriptor model and changed actions ($A^c$); and
displaying a resulting change in outcome result ($O^c$) in accordance with the changed prescriptor model and changed actions ($A^c$).

8. The process of claim 7, wherein the second selection component is a computer-generated graphical user interface selector selected from the group consisting of: radio button, slider, toggle, side-to-side arrows and dropdown arrows.

9. The process of claim 7, further comprising:
selecting to deploy the at least one optimized prescriptor model, the modified prescriptor model or the changed prescriptor model to address the identified problem.

10. The process of claim 1, wherein the predictor surrogate model is a machine learning algorithm.

11. The process of claim 1, wherein the prescriptor model is selected from the group consisting of: a neural network model and a rule set.

12. At least one non-transitory computer-readable medium storing instructions that, when executed by a computer, perform a method for evolving an optimized prescriptor model for determining optimal decision policy outcomes related to an identified problem, the method comprising:
building a predictor surrogate model based on historical training data to predict an outcome;
feeding the predictor surrogate model into an evolutionary algorithm framework to evolve a prescriptor model over multiple generations, wherein subsequent generations are evolved based on results of prior generations until at least one optimized prescriptor model is determined, the optimized prescriptor model including optimal actions (A);
providing the optimal prescriptor actions (A) identified by the at least one optimized prescriptor model to the predictor surrogate model to generate an optimal outcome result (O) based thereon; displaying the optimal prescriptor actions (A) with the optimal outcome result (O) to a user;
providing at least one first selection component to the user to modify at least one value for one or more of the optimal prescriptor actions (A) to generate a modified prescriptor model and one or more modified actions ($A^m$);
providing the one or more modified actions ($A^m$) to the predictor surrogate model to generate a modified outcome result ($O^m$); and
displaying at least the modified outcome result (Om) to the user.

13. The at least one computer-readable medium of claim 12, wherein the historical training data includes both context training data and action training data related to the identified problem.

14. The at least one computer-readable medium of claim 12, the method further comprising: displaying both the modified outcome result ($O^m$) and the optimal outcome result (O) for comparison.

15. The at least one computer-readable medium of claim 12, wherein the at least one first selection component is a computer-generated graphical user interface selector selected from the group consisting of: radio button, slider, toggle, side-to-side arrows and dropdown arrows.

16. The at least one computer-readable medium of claim 12, wherein the at least one optimized prescriptor model is determined from a Pareto-front of multiple evolved prescriptor models.

17. The at least one computer-readable medium of claim 16, wherein each of the multiple evolved prescriptor models in the Pareto-front is generated responsive to balancing multiple objectives underlying a decision policy.

18. The at least one computer-readable medium of claim 17, the method further comprising:
providing a second selection component to the user to vary a percentage contribution to a balance between the multiple objectives, wherein varying the percentage contribution changes the at least one optimized prescriptor model to a changed prescriptor model and changed actions ($A^c$); and
displaying a resulting change in outcome result ($O^c$) in accordance with the changed prescriptor model and changed actions ($A^c$).

19. The at least one computer-readable medium of claim 18, wherein the second selection component is a computer-generated graphical user interface selector selected from the group consisting of: radio button, slider, toggle, side-to-side arrows and dropdown arrows.

20. The at least one computer-readable medium of claim 18, the method further comprising:
selecting to deploy the at least one optimized prescriptor model, the modified prescriptor model or the changed prescriptor model to address the identified problem.

21. The at least one computer-readable medium of claim 18, wherein the prescriptor model is selected from the group consisting of: a neural network model and a rule set.

22. A computer-implemented process for evolving an optimized prescriptor model for determining optimal decision policy outcomes related to an identified problem having at least two objectives comprising:
building a predictor surrogate model based on historical training data to predict an outcome, wherein the historical training data includes both context training data and action training data related to the identified problem;
evolving a prescriptor model within an evolutionary framework including the predictor surrogate model, wherein the prescriptor model is a decision policy which prescribes actions in a context to achieve an outcome, and further wherein evolving the prescriptor model includes evolving the prescriptor model over multiple generations using the predictor model to determine an outcome for each prescriptor model until at least one optimized prescriptor model is identified;

generating an optimal outcome result (O) to the identified problem based on the optimized prescriptor model, wherein the at least one optimal outcome result (O) balances the at least two objectives;

displaying the at least one optimal outcome result (O) to the identified problem to a user, along with optimal actions (A) corresponding to the at least one optimal outcome result and the balances of the at least two objectives;

providing at least one first selection component to the user to modify at least one value for one or more of the optimal actions (A) to generate one or more modified actions ($A'''$);

providing a second selection component to the user to vary a percentage balance between the at least two objectives;

providing selected modified actions ($A'''$) and selected percentage balance between the at least two objectives to the predictor surrogate model to generate at least one modified outcome result ($O'''$); and displaying at least the modified outcome result ($O'''$) to the user.

23. The at least one computer-readable medium of claim 22, the method further comprising: displaying both the modified outcome result ($O'''$) and the optimal outcome result (O) for comparison.

24. The at least one computer-readable medium of claim 22, wherein the at least one first selection component is a computer-generated graphical user interface selector selected from the group consisting of: radio button, slider, toggle, side-to-side arrows and dropdown arrows.

25. The at least one computer-readable medium of claim 22, wherein the at least one optimized prescriptor model is determined from a Pareto-front of multiple evolved prescriptor models.

26. The at least one computer-readable medium of claim 22, wherein the prescriptor model is selected from the group consisting of: a neural network model and a rule set.

* * * * *